(12) United States Patent
Melton et al.

(10) Patent No.: US 11,509,258 B2
(45) Date of Patent: Nov. 22, 2022

(54) SOLAR TRACKING INSTALLATION

(71) Applicant: Xirasol Pty Ltd, Wodonga (AU)

(72) Inventors: Glenn Robert Melton, Wodonga (AU); Allan James Brady, Wodonga (AU)

(73) Assignee: Xirasol Pty Ltd, Wodonga (AU)

( * ) Notice: Subject to any disclaimer, the term of this patent is extended or adjusted under 35 U.S.C. 154(b) by 0 days.

(21) Appl. No.: 16/220,295

(22) Filed: Dec. 14, 2018

(65) Prior Publication Data

US 2020/0195191 A1 Jun. 18, 2020

(51) Int. Cl.
*H02S 20/32* (2014.01)
*F24S 50/20* (2018.01)
*F24S 30/40* (2018.01)

(52) U.S. Cl.
CPC .............. *H02S 20/32* (2014.12); *F24S 30/40* (2018.05); *F24S 50/20* (2018.05)

(58) Field of Classification Search
CPC ......... H02S 20/32; F24S 30/45; F24S 30/452; F24S 30/455; F24S 30/458; F24S 2030/136; F24S 2030/137; F24S 2030/115; F24S 2030/131; F24S 2030/133; F24S 2030/15; F24S 2030/16; F24S 2030/17; F24S 2030/134; F24S 2030/145; F24S 30/40; F24S 50/20
USPC ................................................. 136/244–265
See application file for complete search history.

(56) References Cited

U.S. PATENT DOCUMENTS

| | | | | |
|---|---|---|---|---|
| 4,968,355 | A * | 11/1990 | Johnson ................. | F24S 30/452 136/246 |
| 9,236,514 | B1 * | 1/2016 | Tarico ................... | H01L 31/052 |
| 2010/0101630 | A1 * | 4/2010 | Kats ....................... | H02S 20/32 136/246 |
| 2010/0139647 | A1 * | 6/2010 | Silvestre Mata ..... | F24S 30/455 126/604 |
| 2011/0203640 | A1 * | 8/2011 | Domingo Cabo ...... | H02S 20/32 136/246 |
| 2012/0160991 | A1 * | 6/2012 | Kats ....................... | H02S 20/32 250/203.4 |
| 2013/0334393 | A1 * | 12/2013 | Umemoto ............. | F24S 30/455 248/550 |
| 2014/0216522 | A1 * | 8/2014 | Au .......................... | H02S 20/32 136/246 |

(Continued)

FOREIGN PATENT DOCUMENTS

WO    WO-2013139745 A2 *   9/2013   ............. H02S 20/32

OTHER PUBLICATIONS

WO-2013139745-A2 English machine translation (Year: 2013).*

*Primary Examiner* — Andrew J Golden

(74) *Attorney, Agent, or Firm* — Maier & Maier, PLLC

(57) ABSTRACT

Solar tracking installation includes first movement assembly which functionally engages with the primary axis shaft to cause rotation of the primary axis shaft around the primary axis for moving the plurality of planar modules of solar collector elements in a first rotational direction around the primary axis. The installation further includes a second movement assembly which functionally engages with the secondary movement member to cause tilting of each of the plurality of planar modules of solar collector elements around each respective pivotal mount. In this way the movement of the multitude of solar collection elements is a combination of the rotation of first movement assembly and the tilting motion caused by the second movement assembly.

13 Claims, 23 Drawing Sheets

(56) References Cited

U.S. PATENT DOCUMENTS

| | | | |
|---|---|---|---|
| 2015/0082941 A1* | 3/2015 | Morgan | F16H 57/02 74/606 R |
| 2015/0234031 A1* | 8/2015 | Corio | F24S 30/425 250/203.4 |
| 2016/0036374 A1* | 2/2016 | Ge | H02S 20/32 136/251 |

* cited by examiner

SOLAR TRACKING INSTALLATION

FIELD

The present description relates to installations and components for generating solar power, and to methods of using solar tracking systems for such installations for generating power.

The invention has been developed primarily for use with an array of individual solar collecting elements. However, it will be appreciated that the invention is not limited to this particular use.

BACKGROUND

A variety of different solar collectors have been used to harness the power of the sun as a substitute for power generated by more traditional hydrocarbon sources such as coal, oil, gas and other non-renewable fuels. Solar powered generators have the benefit of being able to use radiation from the sun as a renewable fuel that is regarded as being more sustainable than using hydrocarbon-based fuels owing to the perception of the limited amounts of hydrocarbon-based fuels remaining.

However, to date many solar generating plants have been inefficient. One reason for the inefficiencies results from the basis of movement of the tracking system used for facilitating movement of the solar collectors. In early forms, the solar collectors were stationary leading to significant inefficiencies. In other forms, the solar collectors were only able to move in a single direction only which, whilst improving their efficiency, left much to be desired in providing economically viable amounts of power to compete financially with other sources of power.

An advance of single movement solar generators was incorporation of a dual movement system allowing solar collectors to have 2 degrees of freedom of movement that further improved the efficiencies of the generators. However, to date the driving arrangements of such dual axis or dual movement solar collectors have not been entirely successful for one or other reason owing to such arrangements suffering from problems or shortcomings.

Problems of existing solar generators include that the driving arrangements are:
  expensive, both to manufacture and install,
  are unreliable,
  are inefficient or are wasteful of energy needed to drive
    the driving arrangement requiring the use of some of
    the energy actually generated by the solar collectors to
    move the solar collectors and efficiently,
all of which in turn reduces the power available from the
  generator, and hence their commercial acceptability as a
  viable sustainable alternative to more traditional power
  generation systems.

One example of the expensive, unreliable, inefficient driving arrangement includes various forms of linear actuators. One problem of the currently used linear actuators is their relatively large size that occupies a relatively large footprint reducing the flexibility of the locations within the installation at which the linear actuator could be mounted.

Further, in some locations, the linear actuators restrict movement of the solar collectors by limiting the extent of their travel. This problem is particularly disadvantageous at the extreme ends or limits of their travel, often requiring monitoring of the actual position of the actuator. This necessitates the use of complex and costly sensors for detecting and monitoring the actual position of the actuator.

Accordingly, there is a need to develop a solar generating system which has a driving arrangement that is more reliable and/or more efficient and/or is less costly to manufacture and/or install, and/or is more adaptable for location at different locations within the system, and/or allows a greater range of movement, or has greater control of movement of the solar collectors, than is possible with currently used linear actuators for moving the individual solar collectors.

Accordingly, it is an aim to provide a solar collector installation having a more reliable driving arrangement, and optionally, at a reasonable cost of manufacture and/or installation.

Accordingly, it is an aim to provide a solar collector installation having less expensive driving arrangements, particularly in the form of motors for driving the array of solar collectors.

Accordingly, it is an aim to provide a solar collector installation in the form of a dual axis installation having components which allow improved flexibility in locating driving arrangements for moving solar collectors.

Accordingly, it is an aim to provide a method of generating solar power using a solar power generator in which solar collectors are more closely oriented to be directed to the actual daylight position of the sun during daylight.

Accordingly, it is an aim to provide a method of moving solar collectors, which movement is a combination of two different movements, for producing movement of the solar collectors in two different directions.

Accordingly, in is an aim to provide enhanced precision of movement of the driving arrangement of the solar collector by having more controllable driving arrangements.

It is to be noted that not all embodiments will satisfy all aims. One embodiment may satisfy one aim whereas another embodiment may satisfy another aim. Some embodiments may satisfy two or more aims.

SUMMARY

In one form, the present description relates to solar power generating installations having an array of individual solar collecting elements that can be moved in unison to follow the sun, and to methods of moving the solar collecting elements in unison.

In one form of the present description, the individual solar collecting elements are arranged in groups, so that movement of the array of individual solar collecting elements move in unison with each other, which movement is a combination of movement along or on a primary axis and movement along or on a secondary axis, which combination of movement is such so that the solar collecting elements are directed to face substantially towards the position of the sun during daylight hours.

Embodiments of the solar tracking installation of the present description are provided with separate driving arrangements to independently move the array of solar collector elements in or along a first axis of movement and in or along a second axis of movement to allow the array of solar collector elements to more efficiently move so as to always be directed towards the position of the sun during daylight.

Embodiments of the solar tracking installation of the present description are provided with a driving arrangement in which the drive to the first or primary axis and the drive to the 2nd or secondary axis are interrelated to one another, to both pivot and tilt the solar collector elements.

The invention provides a solar tracking installation having a multitude of solar collection elements arranged in an interconnected array for movement in unison with each other to be directed to the sun during daylight hours comprising at least one elongated substantially torsionally rigid primary axis shaft having a longitudinal primary axis and mounted to allow rotation of the primary axis shaft around the primary axis; an array of a plurality of planar modules of solar collector elements, each mounted pivotally on the primary axis shaft in spaced positions; a secondary movement member extending parallel to the primary axis shaft and connecting to each of the spaced pivotally mounted plurality of planar modules; wherein a first movement assembly functionally engages with the primary axis shaft to cause rotation of the primary axis shaft around the primary axis for moving the plurality of planar modules of solar collector elements in a first rotational direction around the primary axis; and wherein a second movement assembly functionally engages with the secondary movement member to cause tilting of each of the plurality of planar modules of solar collector elements around each respective pivotal mount; wherein the movement of the multitude of solar collection elements is a combination of the rotation of first movement assembly and the tilting motion caused by the second movement assembly.

Preferably the first movement assembly includes at least one driving means to selectively drive rotational motion of the primary axis shaft to move the array of solar collector panels in a generally rotational direction around the primary axis.

The second movement assembly can include at least one driving means to selectively drive linear motion of the secondary movement member to cause tilting of each planar module around each respective pivotal mount.

The orientation of the at least one driving means of the first or second movement assembly is along a secondary axis which is substantially at 90° to the direction of the primary axis.

Preferably one of the at least one driving means includes a first motor to drive the primary axis shaft to move the array of solar collector elements in a first direction forming a first part of the motion of the array. Also another of the at least one driving means can include a second motor to move the secondary movement member to move the array of solar collector elements in a second direction forming a second part of the motion of the array, wherein movement of the array of solar collector elements is a combination of the first motion and the second motion for facilitating location of the array of solar collector elements being directed to the sun.

In one form the installation has a plurality of primary axis shafts arranged parallel with each having respective primary axis wherein the multitude of solar collection elements are arranged in an interconnected array on the plurality of primary axis shafts; a plurality of secondary movement members each related to a respective primary axis shaft; respective first movement assembly and second movement assembly on each primary axis shaft; and the installation further including interconnecting driving members interconnecting at least one driving means on one primary axis shaft with at least one of a first movement assembly and a second movement assembly on an adjacent parallel primary axis shaft. The driving of one primary axis shaft is interconnected to drive the primary movement assembly on another adjacent parallel primary axis shaft and driving of the secondary movement assembly on one primary axis shaft is interconnected to drive the adjacent secondary movement assembly on the parallel primary axis shaft.

In response to corresponding movement of a first movement assembly on a first primary axis shaft moves the multitude of solar collection elements arranged in an interconnected array on the plurality of primary axis shafts in a first direction and movement of the first movement assembly moves the multitude of solar collection elements arranged in an interconnected array on the plurality of primary axis shafts in the second direction, the movement of the multitude of solar collection elements being a combination of movement in the first direction and movement in the second direction.

Preferably the driving means and the interconnecting driving member being functionally engageable substantially in a plane along the direction of the second axis.

In one form the installation includes a first of the first movement assembly on a first primary axis shaft including a driving means and the interconnecting driving member being functionally engageable substantially in a plane along the direction of the second axis to drive the first movement assembly on an adjacent parallel primary axis shaft.

Preferably a plurality of the first movement assembly on a plurality of parallel primary axis shafts each including a driving means and the interconnecting driving member being functionally engageable substantially in a plane along the direction of the second axis to engage and control the respective driving means on the first movement assembly on an adjacent parallel primary axis shaft.

The installation also can include a conversion assembly wherein a rotary motion or a linear motion of an output shaft of a first or second motor of a driving means of the first or second movement assembly is translated by the conversion assembly to linear motion or a rotary motion or a translated positional motion to move the array of solar collector panels in a generally rotational direction around the primary axis or to cause tilting of each planar module around each respective pivotal mount.

The conversion assembly for converting rotary motion of the motor to linear motion of the solar collector panels can include a push rod, a crank and a conrod combination, wherein the rotary motion of the primary axis is converted to linear motion of the solar collector panels by the cooperative interaction of the pushrod, crank and conrod, and arranged such that when the second motor is operated to rotate the output shaft, one end of the conrod rotates while the other end reciprocates to move the crank and pushrod linearly.

The first movement assembly includes a first driving arrangement for providing a first drive to a primary movement member, the first driving arrangement fixedly mounted on the support member for connection to the primary movement member for driving the primary axis shaft in the first direction, and the second movement assembly including a second driving arrangement for providing drive to the secondary movement member, the second driving arrangement fixedly connected to the primary movement member for driving the secondary movement member in the second direction, wherein the second driving arrangement and the primary movement member being movable in unison in response to corresponding movement of the first driving arrangement.

The solar tracking installation can include an intermediate connector interconnecting the primary movement member and the secondary movement member, the solar collector element fixedly connected to the intermediate connector for movement therewith wherein movement of the primary movement member in response to corresponding movement of the first driving arrangement moves the intermediate element in the first direction to move the solar element in the first direction and movement of the second driving arrangement moves the intermediate connector in the second direction to move the solar collector element in the second direction, the movement of the solar collector element for being directed to face the sun being a combination of movement in the first direction and movement in the second direction.

The invention also provides a solar tracking installation having a multitude of solar collection elements arranged in an interconnected array for movement in unison with each other to be directed to the sun during daylight hours, the installation comprising a support structure for supporting the installation, a primary axis module for moving the array of solar collector elements in a first motion, a secondary axis module for moving the array of solar collector elements in a second motion, the primary axis module having a first motor for driving a primary shaft in the first motion, the first motor being fixedly connected to the support structure for connection to the primary shaft for driving the primary shaft in the first motion, the secondary axis module including a second motor for providing a second drive to a secondary shaft, the second motor fixedly connected to the primary shaft for driving the secondary shaft in the second motion, the primary shaft and second motor being driven in unison in the first motion by the first motor, a first connector for interconnecting the primary axis shaft and the secondary axis shaft, the first connector connected to the multitude of solar collector elements so that the secondary shaft and the solar collector elements move in response to movement of the first connector, wherein the first connector moves in the first motion in response to movement of the first motor and the first connector moves in the second motion in response to movement of the second motor, and, movement of the array of solar collector elements to face towards the sun during daylight is a combination of the first motion and the second motion.

Although the present description will include descriptions of embodiments of the solar tracking system, assemblies and components thereof, it is to be noted that the scope of protection is not restricted to the described embodiments, but rather the scope of protection is more extensive so as to include other forms, arrangements and variations of the solar tracking system, assemblies and components thereof, and to methods of operation of the various forms of the solar tracking systems, other than specifically described.

According to one form of the present invention there is provided a solar tracking installation for moving a solar collector element to face the sun during sunlight comprising a support member for supporting the installation, a first movement assembly for moving the solar collector element in the first direction, and a second movement assembly for moving the solar collector element in a second direction, the first movement assembly including a first driving arrangement for providing a first drive to a primary movement member, the first driving arrangement fixedly mounted on the support member for connection to the primary movement member for driving the primary movement member in the first direction, the second movement assembly including a second driving arrangement for providing a second drive to a secondary movement member, the second driving arrangement fixedly connected to the primary movement member for driving the secondary movement member in the second direction, the second driving arrangement and the primary movement member being movable in unison in response to corresponding movement of the first driving arrangement, and an intermediate connector interconnecting the primary movement member and the secondary movement member, the solar collector element fixedly connected to the intermediate connector for movement therewith wherein movement of the primary movement member in response to corresponding movement of the first driving arrangement moves the intermediate element in the first direction to move the solar element in the first direction and movement of the second driving arrangement moves the intermediate connector in the second direction to move the solar collector element in the second direction, the movement of the solar collector element for being directed to face the sun being a combination of movement in the first direction and movement in the second direction.

According to one form of the present invention there is provided a solar tracking installation having a multitude of solar collection elements arranged in an interconnected array for movement in unison with each other to be directed to the sun during daylight hours, the installation comprising a support structure for supporting the installation, a primary axis module for moving the array of solar collector elements in a first motion, a secondary axis module for moving the array of solar collector elements in a second motion, the primary axis module having a first motor for driving a primary shaft in the first motion, the first motor being fixedly connected to the support structure for connection to the primary shaft for driving the primary shaft in the first motion, the secondary axis module including a second motor for providing a second drive to a secondary shaft, the second motor fixedly connected to the primary shaft for driving the secondary shaft in the second motion, the primary shaft and second motor being driven in unison in the first motion by the first motor, a first connector for interconnecting the primary axis shaft and the secondary axis shaft, the first connector connected to the multitude of solar collector elements so that the secondary shaft and the solar collector elements move in response to movement of the first connector, wherein the first connector moves in the first motion in response to movement of the first motor and the first connector moves in the second motion in response to movement of the second motor, and, movement of the array of solar collector elements to face towards the sun during daylight is a combination of the first motion and the second motion.

According to one form of the present invention there is provided a method of tracking movement of the sun during daylight using a solar tracking installation having an array of solar collector elements for generating power in which the movement of the solar collector elements is in accordance with the position of the sun during daylight, the method comprising the steps of, operating a first motor of a primary axis module to move a primary axis shaft to move the array of solar collector elements in a first direction forming a first part of the motion of the array, operating a second motor of a secondary axis module to move a secondary shaft to move the array of solar collector elements in a second direction forming a second part of the motion of the array, wherein movement of the array of solar collector elements is a combination of the first motion and the second motion for facilitating location of the array of solar collector elements being directed to the sun.

It is clear that the invention in various forms provides one or more of the following advantageous features:
   a) Dual axis tracking
   b) Distributed support structure
   c) Maximised ground coverage to yield
   d) Statically balanced moving structure
   e) Very low to zero maintenance
   f) Good utilization of bi face PV module efficiencies
   g) Modular construction utilizing robotic manufacture h) Main subassemblies built off site and pre-tested
i) Localised string inverters reduce single fault impact
j) Dual axis backtracking to maximise yield.

Forms of the solar tracking installation have one or more of the following advantages.

Forms of the solar tracking installation having electric motors with output shafts for rotating the driving the linear arm include one or more of the following:
- a) Using rotary motors eliminates the limits of travel of the actuator of the linear actuator which form the finite boundaries of linear movement of the actuator.
- b) Use of the rotary motors eliminates the requirement to monitor the limits of travel of the actuator thereby obviating the need to use limit switches or sensors.
- c) Use of the rotary motors eliminates all failures associated with electrical circuitry and devices that would be needed to monitor the limits of travel of the actuator.
- d) Using rotary motors eliminates all further mechanical damage to the mechanisms used in association with the linear actuators in the solar tracking installation and/or to the structure of the installation or component parts due to a failure to monitor the limits of movement of the actuators.
- e) Using rotary motors provides a driving system that has a torque profile closely matched to the load.
- f) The use of rotary motors results in enhanced efficiency of the driving arrangement and their components.
- g) The use of available standardised drive units reduces costs of installing and maintaining, including servicing, of the driving arrangements It is to be noted that not all forms of rotary drive units have all the advantages indicated above. Some drive units will have one advantage whereas other drive units may have another advantage, and some drive units may have two or more advantages.

In particular forms, the invention provides the advantages of:
- a) The way the main beam rotates around a bearing. The main beam does not spin.
- b) The way main beams sit along an East/West line and the panels above and below main can tilt east/west.
- c) The way the panels can tilt east/west through the main loop allowing for North South Movement.
- d) The way the motors/inverter gear boxes are installed on a structure that is installed as a single structure.
- e) The use of a jig and algorithm with total station to align the main beam.
- f) The specifically designed piling rig with total station for piling the heavy 4.5 posts.
- g) The balance of the panels on the frame above and below the main beam.
- h) The use of a machined drive shaft for adjusting the tilt on the first set of east/west panels and then a punched shaft to move the rest.

Other advantages will be understood by the person skilled in the art in light of the following.

BRIEF DESCRIPTION OF DRAWINGS

Forms of the installation will now be described by way of examples to illustrate the scope of protection, with reference to the accompanying drawings in which.

Figure 13:
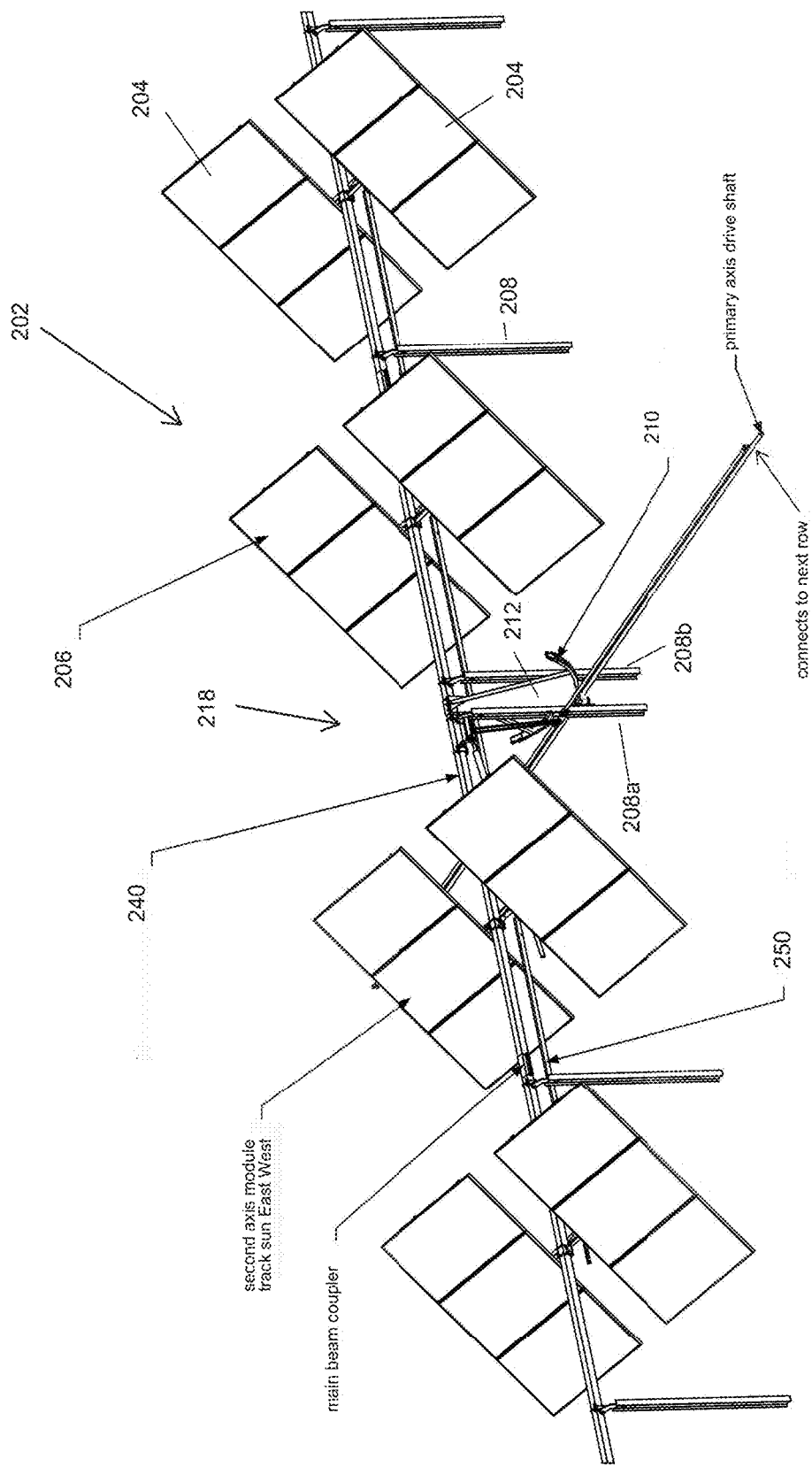
FIG. 13 is a schematic perspective view of one part of another form of the solar tracking installation having another form of the driving assemblies for moving the multitude of solar tracking modules to face towards the sun.
Figure 20:
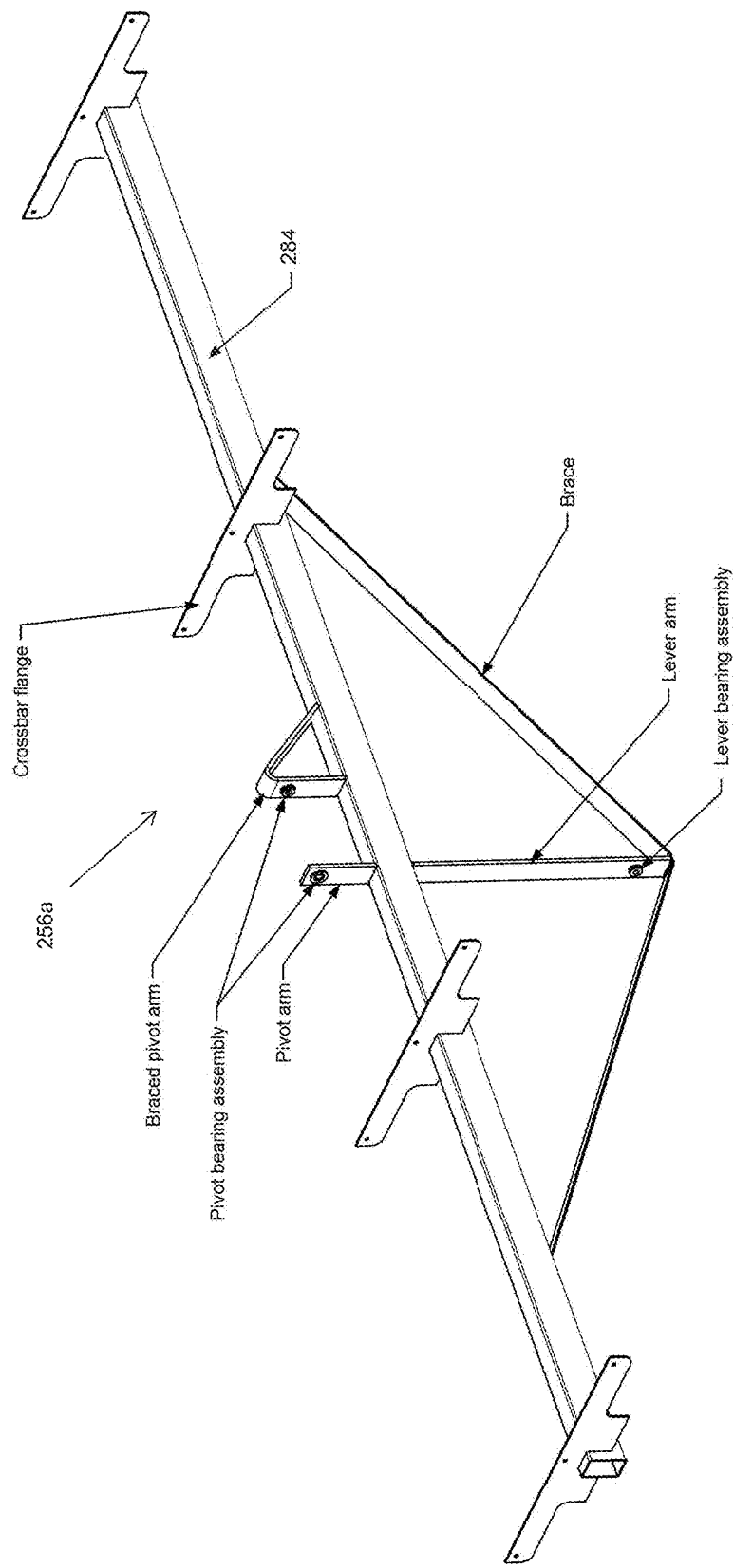

FIG. 20 is a schematic perspective view of one form of the cross bar for mounting PV panels to the form of the solar tracking installation shown in FIG. 13 showing the crossbar in isolation.

Figure 21:
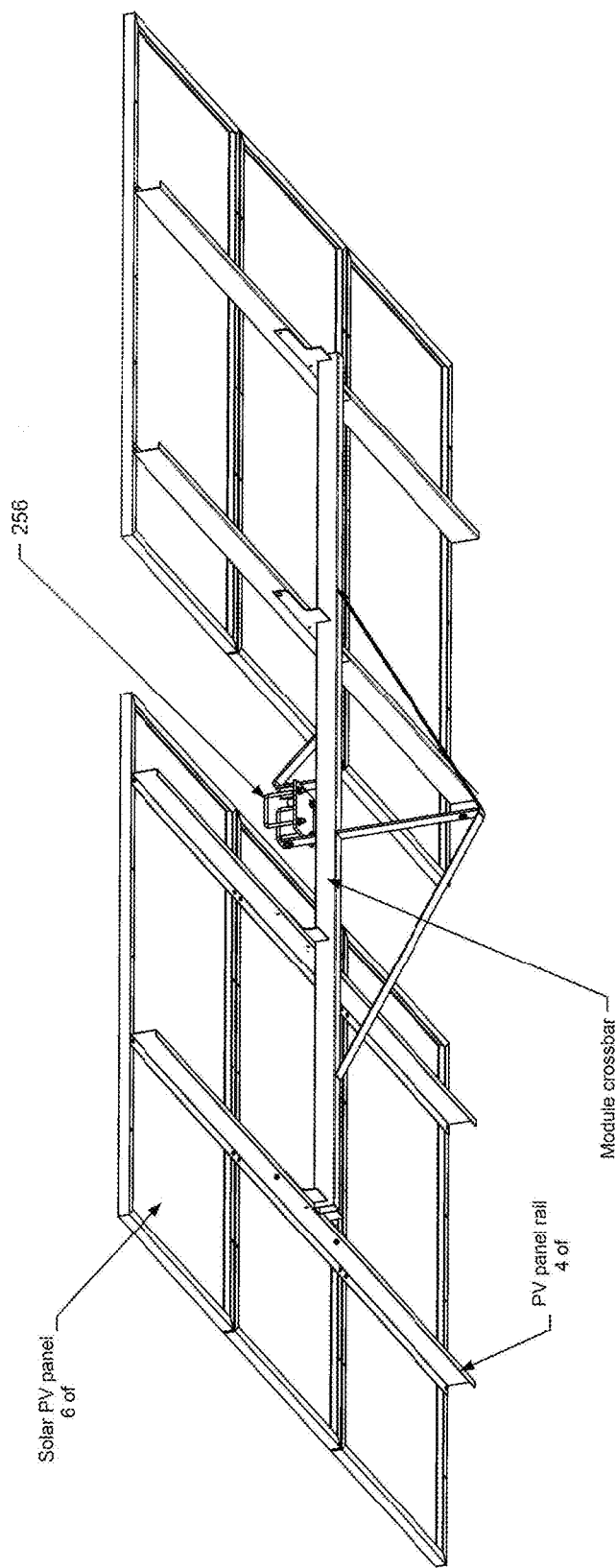

FIG. 21 is a schematic underneath view of one form of the module having 6 PV panels when mounted on the cross bar of the module of the form of the solar tracking installation of FIG. 13 showing the module pivot saddle.

Figure 22:
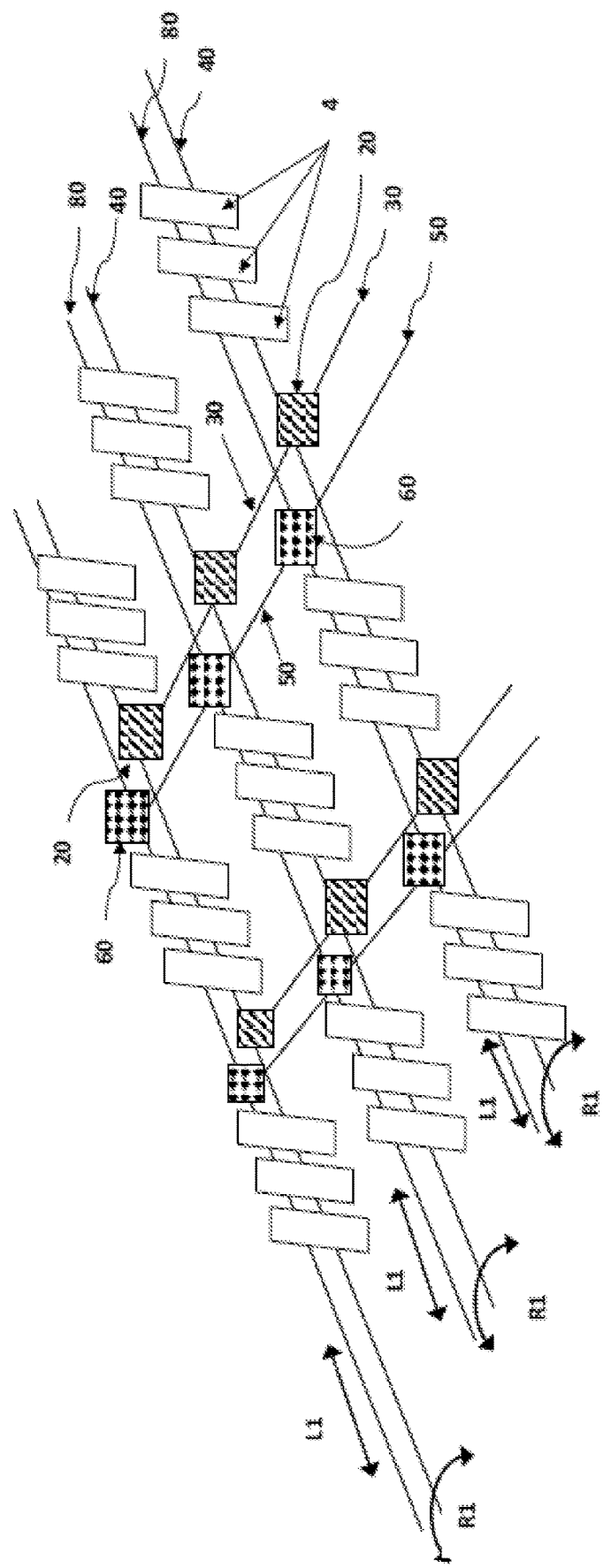
Figure 23:
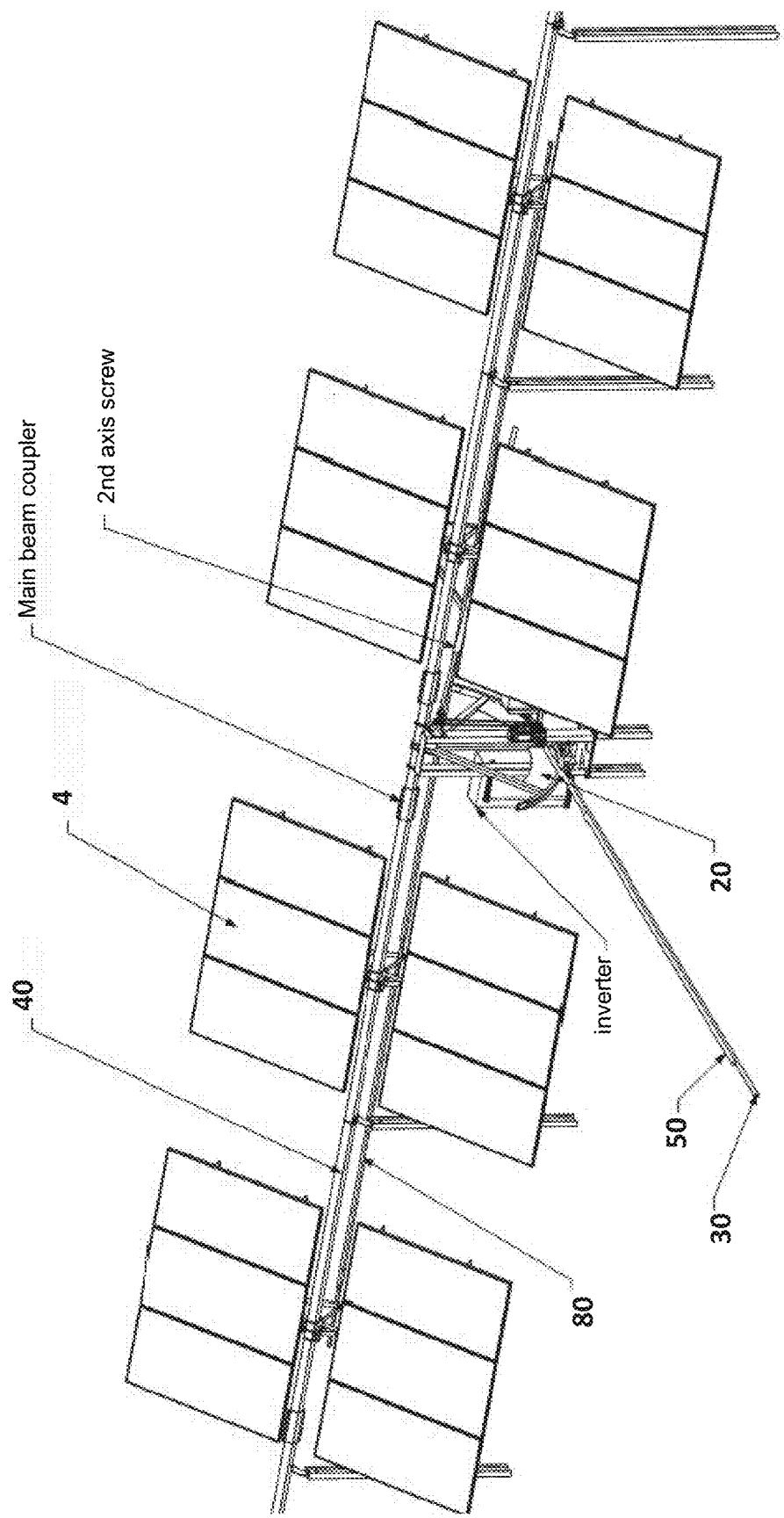

FIG. 22 is a schematic perspective view of an extended interactive array of an interconnected form of a multitude of solar collection panels on parallel primary axis shafts with interconnected control of drive of movement of operation of the two degrees of alteration of alignment of solar panels to face the sun in accordance with an embodiment of the solar tracking installation of the invention FIG. 23 is a schematic perspective view of third embodiment as used in the system of FIG. 22 and with components from first embodiment of FIGS. 5 to 12 and/or from second embodiment of FIGS. 13 to 21.

DETAILED DESCRIPTION

It should be noted in the following description that like or the same reference numerals in different embodiments denote the same or similar features.

Figure 1:
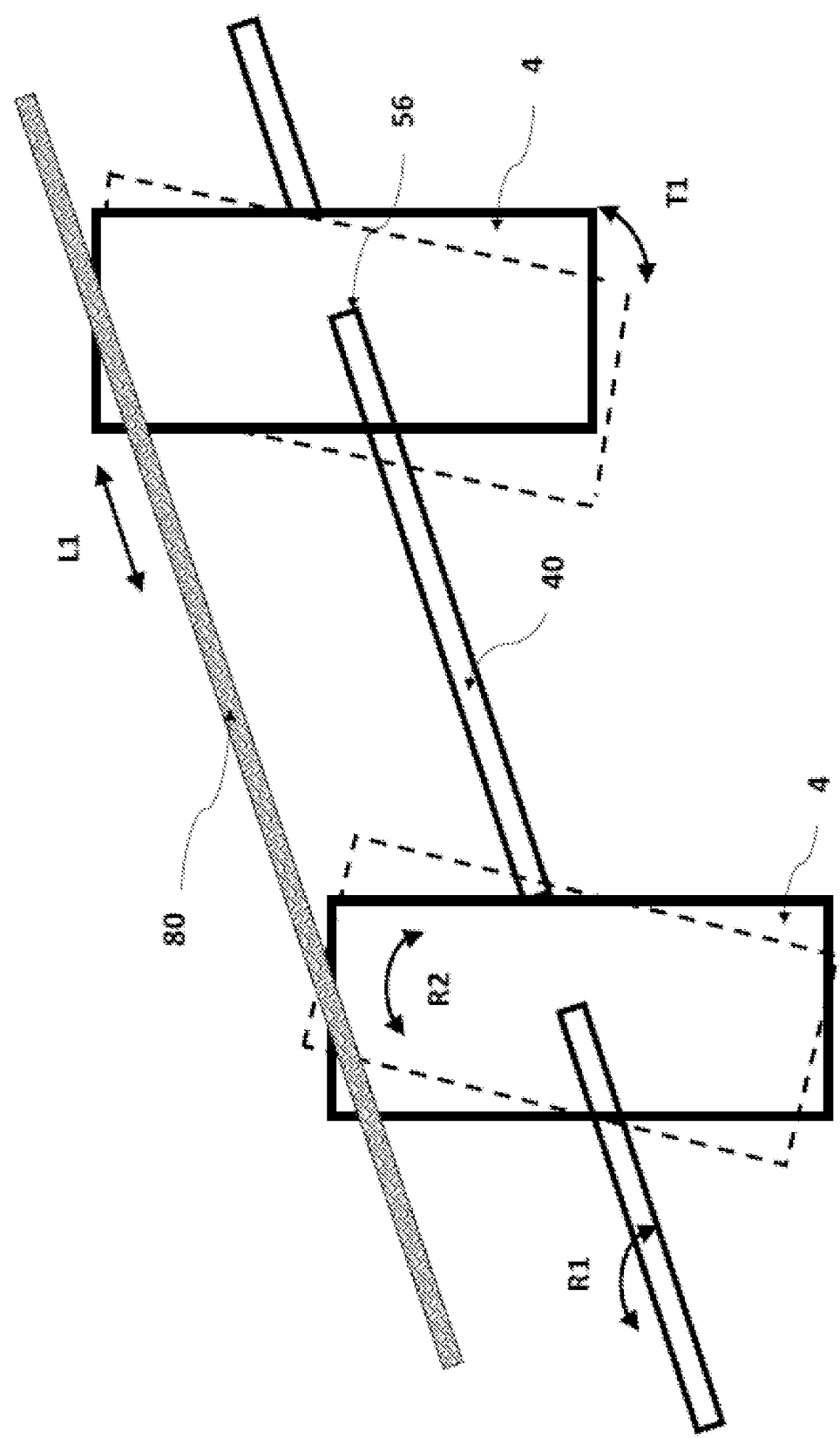
FIG. 1 is a diagrammatic view of the operation of the two degrees of alteration of alignment of solar panels to face the sun in accordance with the usage of an embodiment of the solar tracking installation of the invention having a multitude of solar collection panels.
Figure 2:
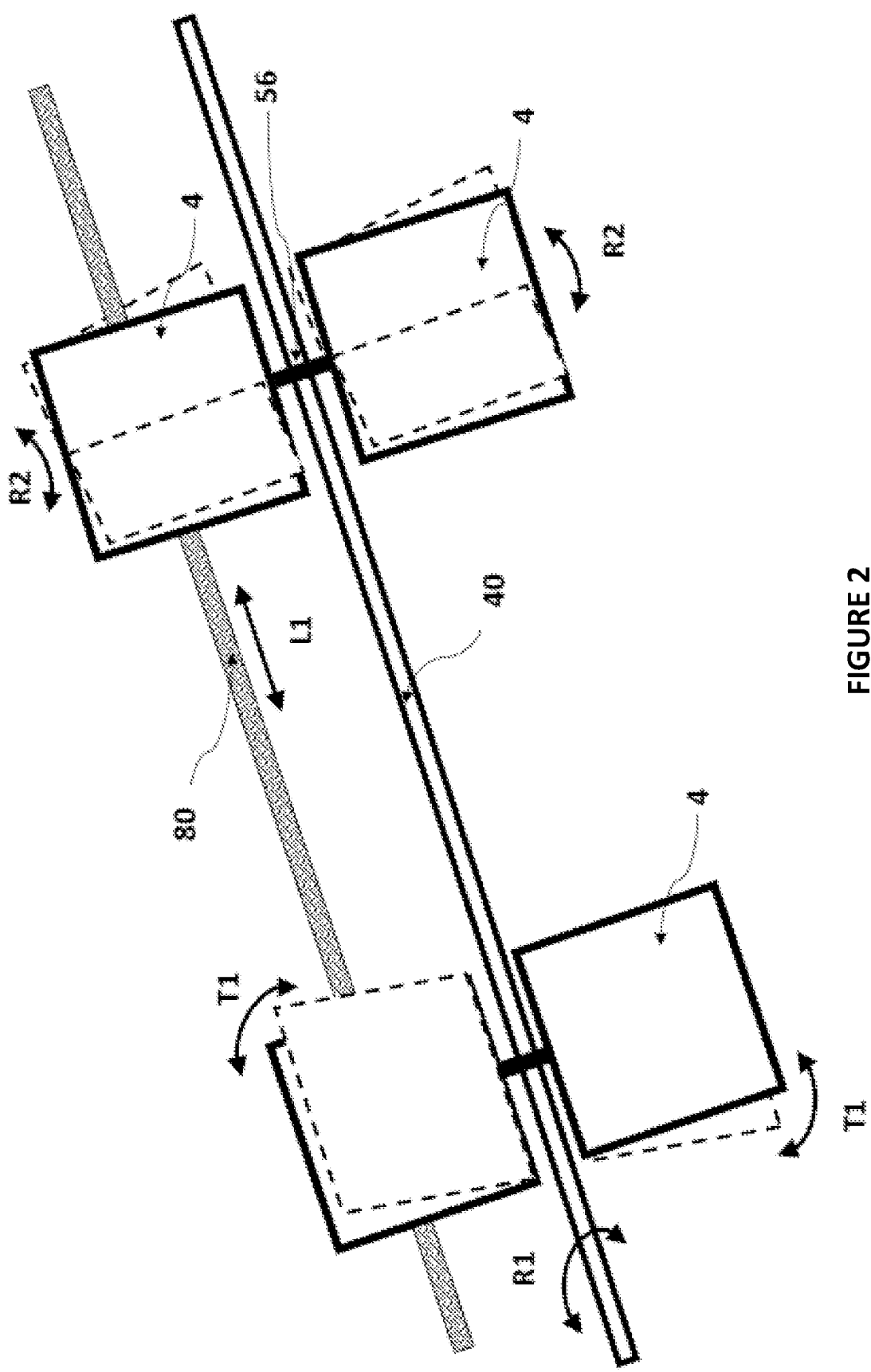
FIG. 2 is another diagrammatic view of the operation of the two degrees of alteration of alignment of solar panels to face the sun in accordance with the usage of an embodiment of the solar tracking installation of the invention having a multitude of solar collection panels.

Referring to FIGS. 1 and 2 there are diagrammatic views of the operation of the two degrees of alteration of alignment of solar panels to face the sun in accordance with the usage of an embodiment of the solar tracking installation of the invention having a multitude of solar collection panels.

In one form of the invention there is a solar tracking installation having a multitude of solar collection elements 4 each mounted on a framework to form a module of planar solar collection elements 4. Each module 4 is arranged in an interconnected array for movement in unison with each other to be directed to the sun during daylight hours.

There is at least one elongated substantially torsionally rigid primary axis shaft 40 having a longitudinal primary axis and mounted to allow rotation of the primary axis shaft around the primary axis. This shaft is mounted off the ground such that the modules of solar collection elements 4 can extend above and below the primary axis shaft 40.

An array of a plurality of planar modules of solar collector elements 4, each are mounted pivotally at pivot points 56 on the primary axis shaft 40 in spaced positions. The pivot connection is such that each planar module of solar collection elements 4 is able to rotate with the rotation of the primary axis shaft 40 around the primary axis or to pivot around the respective pivot points 56 on the primary axis shaft 40.

Each of the two degrees of alteration of alignment of solar panels is separately controllable. The installation includes a secondary movement member 80 extending parallel to the primary axis shaft 40 and connecting to each of the spaced pivotally mounted plurality of planar modules 4. This movement member 80 can be a rigid or flexible elongated member or an operative assembly that connects to each of a plurality of spaced planar module of solar collection elements 4.

The installation includes a first movement assembly 20 which functionally engages with the primary axis shaft 40 to cause rotation of the primary axis shaft 40 around the primary axis for moving the plurality of planar modules of solar collector elements 4 in a first rotational direction around the primary axis.

As shown in FIG. 1 the rotational action R1 on the primary axis shaft 40 causes the rotational action R2 of the planar modules of solar collector elements 4 around the primary axis shaft 40. Also as shown in FIG. 1, the longitudinal or linear movement L1 of the secondary movement member 80 on the planar modules of solar collector elements 4 at a distance spaced to the pivotal mount 56 causes the tilting action T1 of the planar modules of solar collector elements 4 around the pivotal mount 56.

It can be understood that FIG. 1 is diagrammatic and for simplicity only shows operation of one planar module of solar collector elements 4 in one degree of alteration of alignment while the other shown planar module of solar collector elements 4 has the other one degree of alteration of alignment. In practice each planar module of solar collector elements 4 undertakes each degree of alteration of alignment in unison so that they all undertake the same change of direction to face the sun. Similarly FIG. 2 is diagrammatic and simplified drawing to allow understanding, but which in practice each planar module of solar collector elements 4 undertakes each degree of alteration of alignment in unison so that they all undertake the same change of direction to face the sun.

It is also to be understood that the pivotal mount 56 (or 256 in FIG. 21) of the planar modules of solar collector elements 4 can be at different points on the framework of the planar modules of solar collector elements 4. Therefore, in FIG. 2, the rotational action R1 on the primary axis shaft 40 causes the rotational action of the planar modules of solar collector elements 4 around the primary axis shaft 40 but due to the position and arrangement of the pivotal mount results a tilting T1 effect on the planar module of solar collector elements 4. Also, as shown in FIG. 2, the longitudinal or linear movement L1 of the secondary movement member 80 on the planar modules of solar collector elements 4 at a distance spaced to the pivotal mount 56 causes the rotational action R2 of the planar modules of solar collector elements 4 around the pivotal mount 56.

Figure 3:
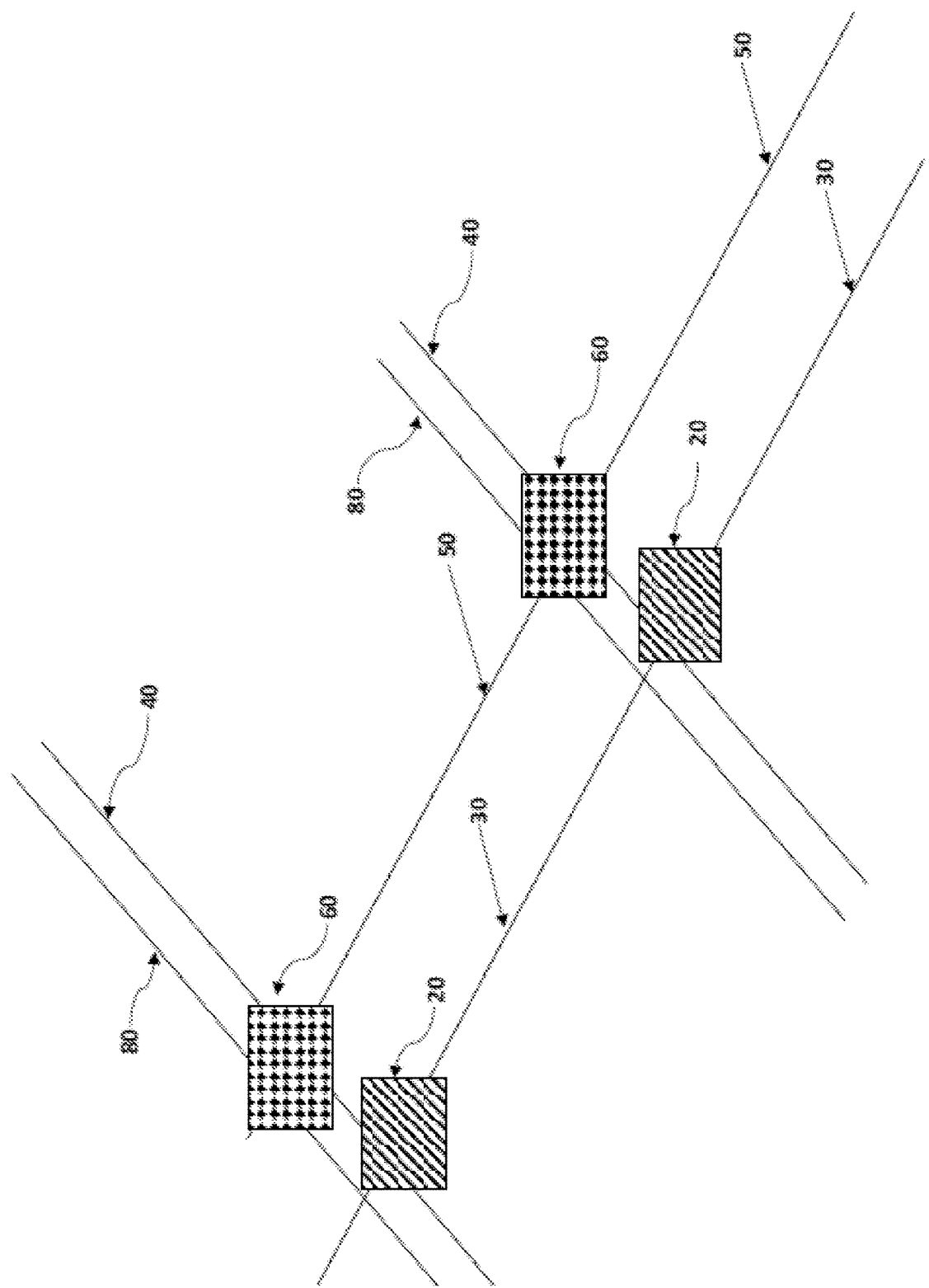
FIG. 3 is a schematic perspective view of an interconnected form of a multitude of solar collection panels on parallel primary axis shafts with interconnected control of drive of movement of operation of the two degrees of alteration of alignment of solar panels to face the sun in accordance with an embodiment of the solar tracking installation of the invention.

Referring to FIG. 3 the installation includes first movement assembly 20 which functionally engages with the primary axis shaft 40 to cause rotation of the primary axis shaft 40 around the primary axis for moving the plurality of planar modules of solar collector elements 4 in a first rotational direction around the primary axis. The installation further includes a second movement assembly 60 which functionally engages with the secondary movement member 80 to cause tilting of each of the plurality of planar modules of solar collector elements 4 around each respective pivotal mount 56, 256. In this way the movement of the multitude of solar collection elements is a combination of the rotation of first movement assembly and the tilting motion caused by the second movement assembly.

The first movement assembly includes at least one driving means to selectively drive rotational motion of the primary axis shaft 40 to move the array of solar collector panels 4 in a generally rotational direction around the primary axis. The second movement assembly 60 includes at least one driving means to selectively drive linear motion of the secondary movement member 80 to cause tilting of each planar module 4 around each respective pivotal mount 56, 256.

At least one driving means includes a motor to move the primary axis shaft 40 to move the array of solar collector elements 4 in a first direction or the secondary movement member 80 to move the array of solar collector elements 4 in a second direction, wherein movement of the array of solar collector elements 4 is a combination of the first motion and the second motion for facilitating location of the array of solar collector elements being directed to the sun.

Along a primary axis shaft 40 can be a plurality of spaced primary or secondary movement assembly 20, 60 so as to effect operation at different points along the primary axis shaft 40. This means that each planar modules of solar collector elements 4 is actioned in unison.

However, each primary or secondary movement assembly 20, 60 need not have a drive motor. Instead they can have a drive assembly that functionally engages an interconnecting driving member 30, 50 from another primary or secondary movement assembly 20, 60 to effect the drive on the respective primary axis shaft 40 or respective secondary movement member 80.

A beneficial action is when the orientation of the at least one driving means of the first or second movement assembly is along a secondary axis which is substantially at 90° to the direction of the primary axis. This provides a ready control from a side of the array. It is even more beneficial when there are two drive means 30, 50 and each is parallel to each other along a secondary axis which is substantially at 90° to the direction of the primary axis.

Further as shown in FIG. 3 and more elaborately in FIG. 22 the installation can include a plurality of primary axis shafts 40 arranged parallel with each having respective primary axis wherein the multitude of solar collection elements 4 are arranged in an interconnected array on the plurality of primary axis shafts 40. There is a plurality of secondary movement members 80 each related to a respective primary axis shaft 40.

Due to the size and plurality of planar modules of solar collector elements 4 there are a plurality of respective first movement assemblies 20 and second movement assemblies 60 on each primary axis shaft. To operate this network the installation further includes interconnecting driving members 30, 50 interconnecting at least one driving means on one primary axis shaft 40 with at least one of a first movement assembly 20 and a second movement assembly 20 on an adjacent parallel primary axis shaft 40.

In use driving of one primary axis shaft 40 is interconnected to drive the primary movement assembly 20 on another adjacent parallel primary axis shaft 40 and driving of the secondary movement assembly 60 on one primary axis shaft 40 is interconnected to drive the adjacent secondary movement assembly 60 on the parallel primary axis shaft 40. Thereby in response to corresponding movement of a first movement assembly on a first primary axis shaft moves the multitude of solar collection elements arranged in an interconnected array on the plurality of primary axis shafts in a first direction and movement of the first movement assembly moves the multitude of solar collection elements arranged in an interconnected array on the plurality of primary axis shafts in the second direction, the movement of the multitude of solar collection elements being a combination of movement in the first direction and movement in the second direction.

Figure 4:
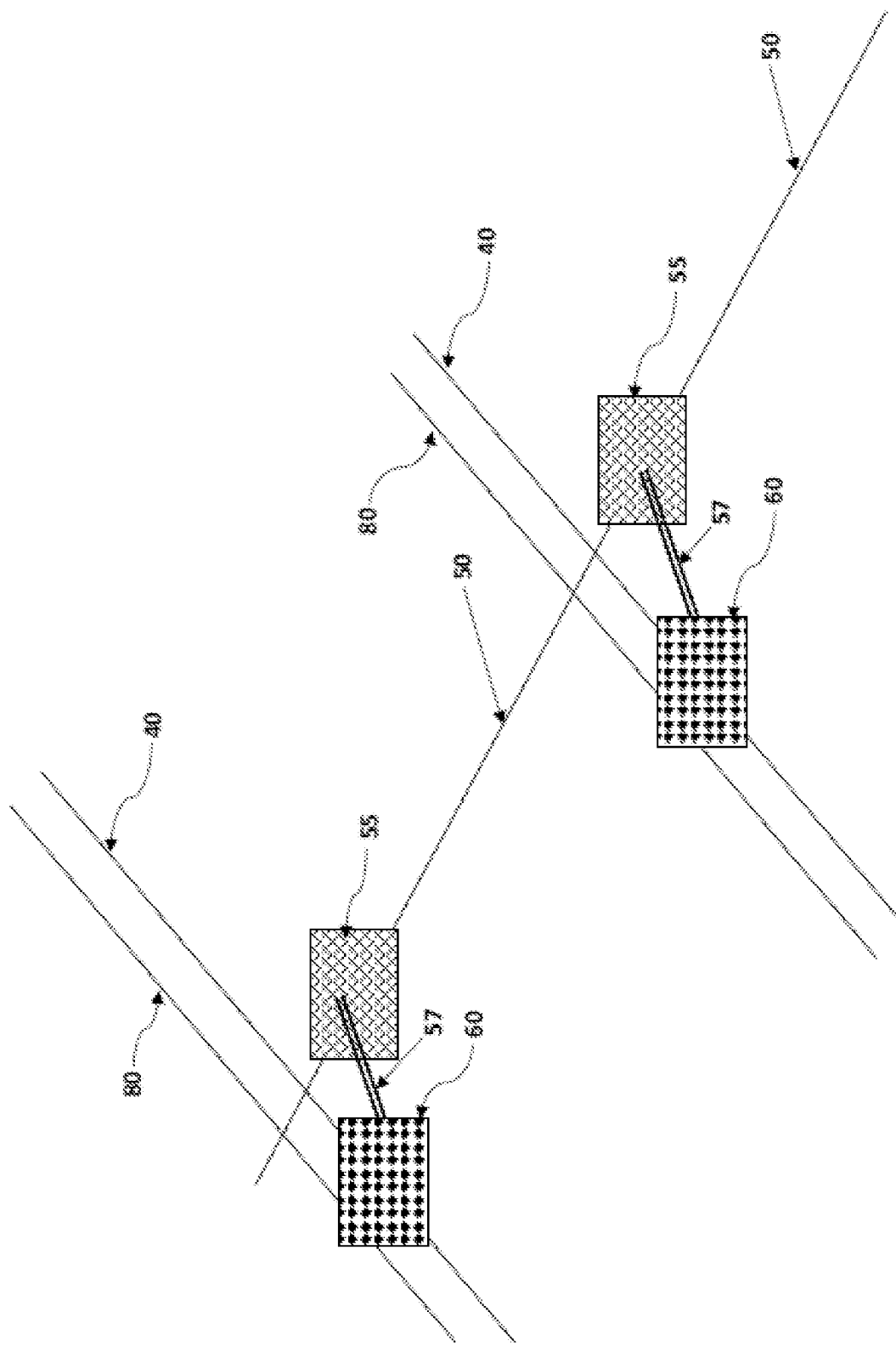
FIG. 4 is a schematic perspective view of a conversion element of drive to operation of first or second movement assembly on parallel primary axis shafts with interconnected control of drive of movement of operation of the two degrees of alteration of alignment of solar panels to face the sun in accordance with an embodiment of the solar tracking installation of the invention.
Figure 5:
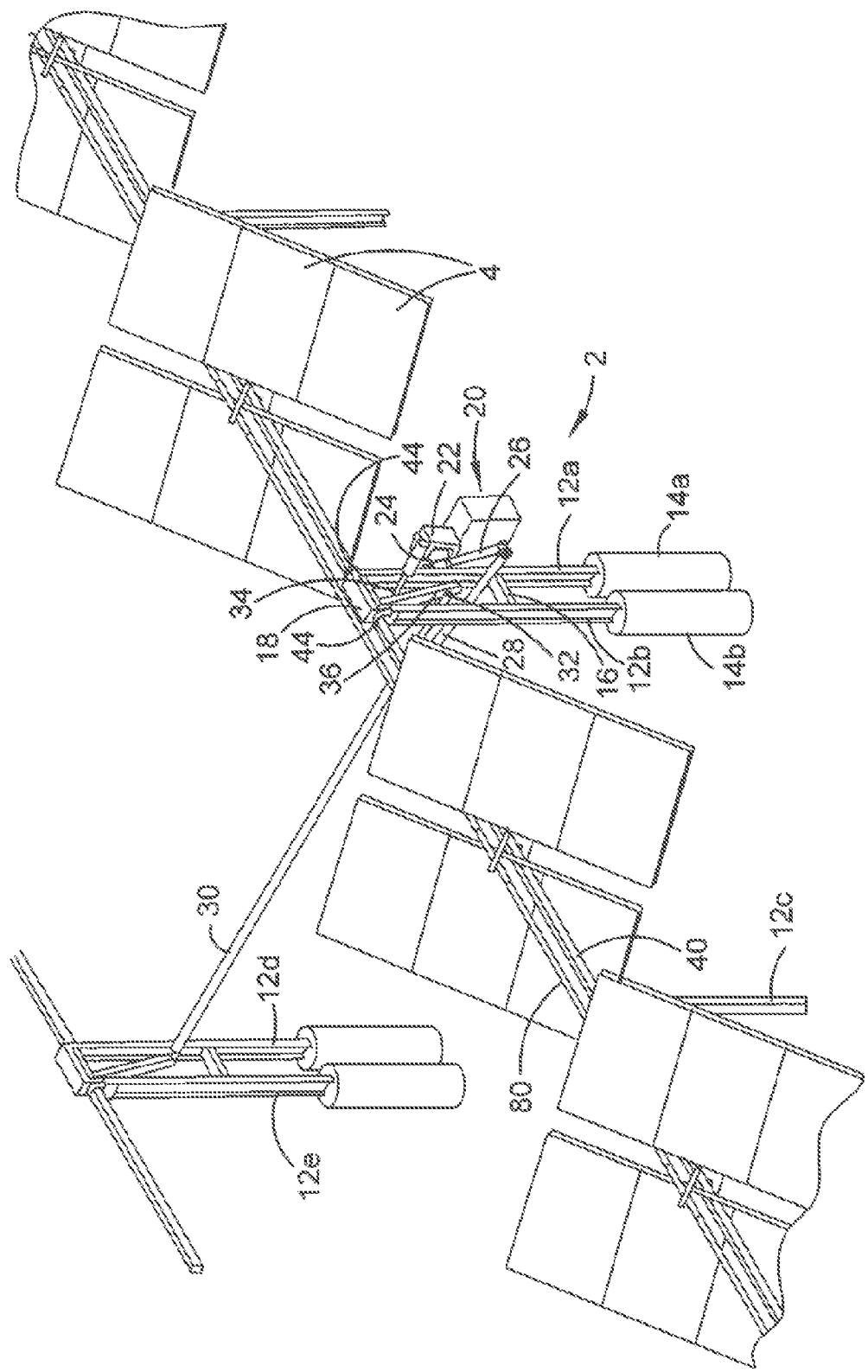
FIG. 5 is a schematic perspective view of one section of one form of a solar tracking installation having a multitude of solar collector elements.
Figure 6:
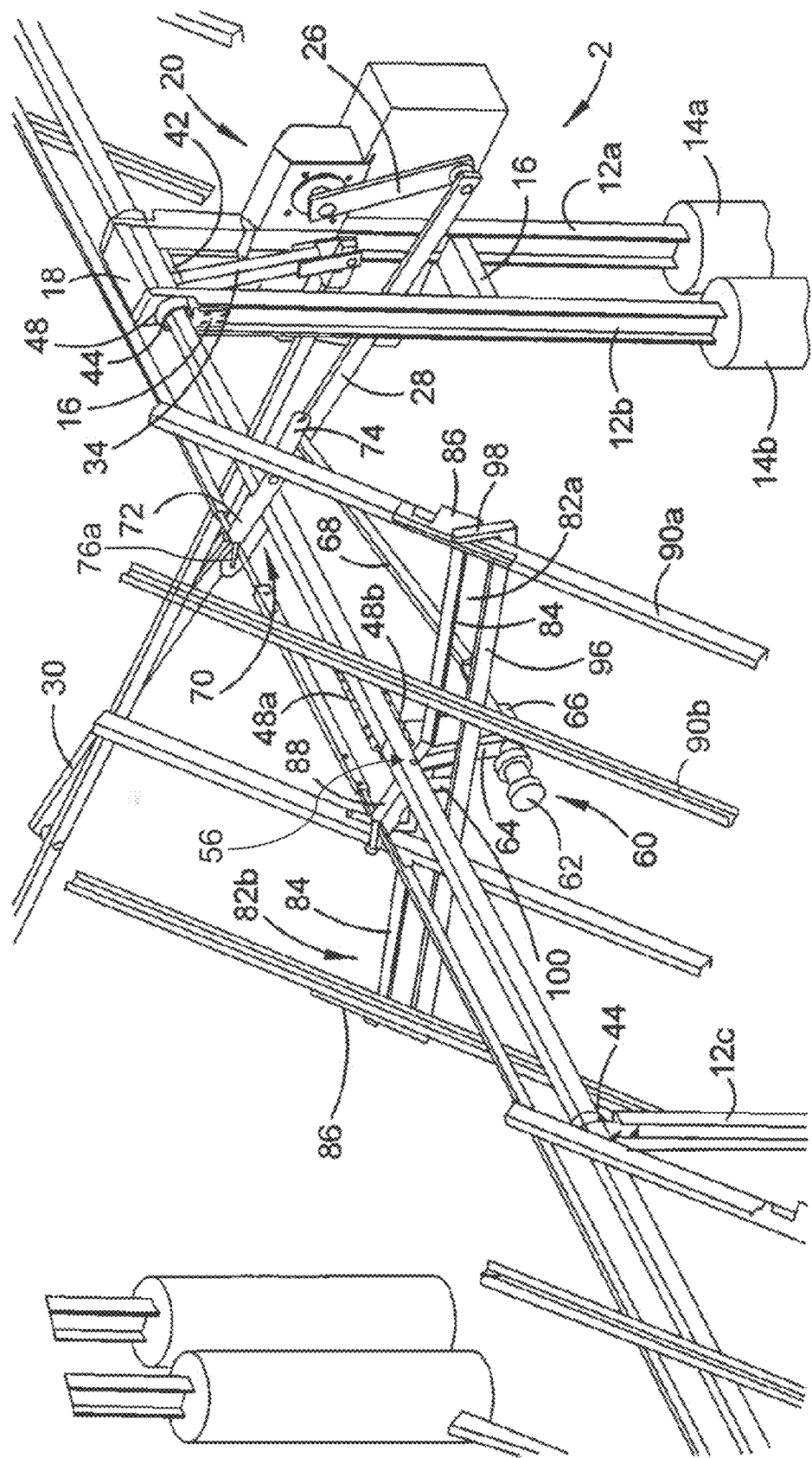
FIG. 6 is a schematic perspective view of the section of the installation of FIG. 1 from which the solar collector elements are omitted to reveal details of the second movement module.

Referring to FIG. 4 it is shown that the driving means 30, 50 can have a conversion assembly wherein a rotary motion or a linear motion of an output shaft of a first or second motor of a driving means 30, 50 of the first or second movement assembly 20, 60 is translated by the conversion assembly to linear motion or a rotary motion or a translated positional motion to move the array of solar collector panels 4 in a generally rotational direction around the primary axis or to cause tilting of each planar module around each respective pivotal mount 56, 256.

The solar collector elements can have any suitable or convenient form or type.

Forms of the solar collector elements include solar panels, photovoltaic panels, solar radiators, thin film solar photovoltaic panels, micro-concentrating solar photovoltaic panels, mirrors or the like.

Preferred forms of the solar panels include the following: solar photovoltaic modules comprising multiple photo voltaic panels which modules are capable of generating an excess of about 300 W or the like, depending upon the number of individual panels in the module.

The number of individual panels forming the array of panels can be any suitable or convenient number. Typical numbers of panels are in the range from about 24 to about 500, preferably about 48 to about 384, more preferably from about 192 to about 384.

Forms of the array include individual panels, pairs of panels, groups of panels and the like. Preferred forms of the array include six individual panels, typically arranged as a first group of three and a second group of three located in spaced apart pairs. In one form, the solar panels need to have the two sets of standard mounting holes typically found on 290 W panels and larger. It is to be noted that the individual panels can be arranged in any suitable or convenient pattern, array, configuration or arrangement depending upon requirements, and can be connected together in any suitable form or arrangement as required to face towards the sun during daylight. Forms of the pattern or arrangement are symmetrical about a central axis, or other forms are asymmetrical or are regularly repeating or are random, depending upon circumstances.

The support structure and support members can have any suitable form or be of any suitable type, including being a single member, a pair of members, or a group of members. Typically, parts of the same support structure or different support structures are located in spaced apart relationship to one another. In forms of the installation, there are main support structures, typically located centrally within the installation, and other support structures.

Forms of the support member for supporting the installation can be any suitable or convenient form such as for example, posts, uprights, beams, I-beams, including a mixture of a single support member, or a pair of members, particularly, a pair of members in spaced apart relationship to each other, or a group of spaced members.

Forms of the support member are fixedly located in the ground to support the installation, either directly by being driven directly into the ground and secured therein, such as cemented into a post hole or similar, or indirectly by using a suitable foundation, such as for example, a lower foundation in which the poles or posts are concreted or cemented onto suitable securing means to securely anchor the poles or posts in position, such as for example, by having foundations, typically, in the form of piles, columns, pillars, or the like, including concrete or cement foundations for receiving or mounting the posts or poles therein or thereon. Typically, there are a multitude of poles or posts in spaced apart relationship to one another to support the installation. The poles or posts are located in linear relationship to one another in any suitable array, pattern, grid or arrangement depending on the size of the installation. In forms of the installation the poles or are all substantially the same whereas in other forms of the installation there are key poles or posts which provide additional strength and support for the installation such as main centrally located posts or poles.

Preferably, the main centrally located support is a pair of spaced apart substantially parallel upright extending posts or poles, typically in the form of I-beams.

Forms of the first movement assembly or the first primary axis module include a suitable driving means, typically in the form of a motor, preferably a stepper motor or similar, and more typically combined with a reduction gearbox for producing very slow rotation of the output shaft of the gearbox for driving movement of the primary axis, preferably driving movement having fine control for precisely controlling the movement of the solar collectors corresponding to the speed of movement of the sun across the sky during daylight so that the panels move to face towards the sun.

Typical examples of the motor and gearbox combination include an electrically driven motor, preferably a three-phase motor, more preferably, a three-phase induction motor.

Typical examples of the gearbox of the motoring gearbox combination include gearboxes having a final gearbox ratio sufficient to self-lock the output. Preferably, the gearbox includes a single start worm drive as the final drive element in the gearbox.

Forms of the first movement or first motion include a motor/gearbox combination provided by SEWDRIVE, preferably Model Number SF77R37DR63S4 at 0.2 RPM.

Forms of the second movement or second motion include a motor/gearbox combination provided by SEWDRIVE, preferably Model Number SF47R1 DR63S4 at 3 RPM or lower.

Although in forms of the installation the orientation of the primary axis can be in any suitable or convenient direction or motion, the preferred orientation is in the North South alignment. Usually, the orientation of the secondary axis is substantially at 90° to the direction of the primary axis.

Forms of the primary movement member include shafts, rods, tubes, bars, levers and the like. A preferred form of the movement member or primary axis is a generally square section rod, tube or bar, optionally having longitudinally extending chamfered edges, more typically a square hollow section or a rectangular hollow section tube.

Typically, the shaft includes multiple square section tubes, rods or bars joined in end to-end relationship to each other, to extend the length of one dimension of the solar tracking installation. A preferred primary axis member is one or more lengths of square hollow section of a suitable thickness or grade in which the individual sections are joined to one another collinearly by suitable couplings, connectors, couplers, joiners or the like.

In forms of the installation, the hollow square section in the form of a tube or shaft is supported at the top of the poles or posts using a suitable fitting that supports the shaft whilst allowing it to rotate. One form of the fitting is a bearing allowing rotational movement of the rod or shaft. One form of the bearing is a universal bearing or self-aligning bearing, typically a self-aligning plain bearing, that adjusts the position of the rotating part of the bearing and the fixed part of the bearing for allowing slight alignment of the shaft, particularly alignment of the lengthwise extending axis of the shaft, more particularly, when the shaft comprises multiple sections adjoined end-to end with respect to the post or pole, such as for example, when using suitable couplings or joiners or the like, particularly the vertical orientation of the post or pole, which is supporting the shaft.

In forms of the installation, the main beam, shaft or axis is supported by a connector, typically in the form of a flange, more typically in the form of a curved flange.

Preferably, the connector is a main beam pivot flanged extending from the upper distal end of the post to a bracket, typically in the form of a main beam pivot saddle, attached to the main beam.

Forms of the secondary movement member or secondary axis member also include shafts, rods, bars, levers, tubes or similar. Typically, the secondary shaft is different to the primary shaft, and is a square hollow section or rectangular hollow section having different dimensions to the primary shaft.

Forms of the second drive or drive for the secondary movement member or secondary axis member include a motor, a reduction gearbox and a belt extending between two pulleys for rotatingly driving the secondary axis member. Preferably, the second drive includes a drive screw for driving one of the pulleys, typically a toothed pulley.

In forms of the installation, the lengthwise axis of the primary axis shaft and the lengthwise axis of the secondary axis shaft extend in spaced apart substantially parallel relationship to one another from at or towards one side of the installation to the opposite side of the installation. In forms of the installation the spacing apart of the primary axis shaft and the secondary axis shaft is maintained by a connector, typically an elongate connector, preferably a transversely extending elongate connector.

Forms of the installation include a framework arrangement fixedly connected to the connector to which the individual solar collectors are mounted to form an array of panels. In one form, the framework arrangement includes framework elements, typically rails. In one form, the rails extend in parallel spaced apart relationship to each other and are movable in response to movement of the connector. However, it is to be noted that the mounting of the panels to the installation can be in any suitable or convenient manner, including using cross bar flanges, braced pivot arms, lever arms, braces and suitable bearings or bearing assemblies.

One form of the connector is a generally U-shaped link having a central elongate web portion, a first side plate portion for connection to one of the framework members, and a second side bridging portion for extending from the primary axis shaft to the secondary axis shaft.

Typically, the connector is pivotally connected to the primary axis shaft intermediate the ends of the inner side bridging portion and the second side bridging portion is pivotally connected to the secondary axis shaft at or towards the distal end of the inner bridging portion.

In forms of the installation, the connector is a pair of connectors located in spaced apart side-by-side relationship to one another with the bridging portion of the inner side of one connector located on one side of both the primary axis shaft and the secondary axis shaft, and the bridging portion of the inner side of the other connector is located on the other side of the primary axis shaft and the secondary axis shaft to transmit respective movements of the primary axis shaft and the secondary axis shaft to the solar collector elements to move the solar collector elements to always face directly towards the sun during daylight.

Forms of the installation include a stabiliser. In forms of the installation, the stabiliser is associated with the connector. Typically, the stabiliser assists in locating the connector, more typically in both strengthening and rigidifying the connector to retain the solar collector panels in place on the framework.

In forms of the installation, the rotary motion of the output shaft of the first motor is translated to linear motion of the primary axis shaft to move the array of panels from side to side in an arcuate motion, typically in a motion to track the movement of the sun.

In one form the rotary motion of the second motor is transmitted to the secondary axis shaft to form linear motion for tilting the array of panels backwards and forwards in a direction generally perpendicular to the direction of the arcuate motion from side to side of the primary axis. In both the primary axis and secondary axis the rotary motion of the motor is converted to linear motion of the push rod by a crank and connecting rod or conrod combination.

The movement of the array of panels caused by the first motor and by the second motor, is a combination of the arcuate swinging motion from side to side and the backwards and forward tilting motions.

In forms of the installation the length of the motor drive arm is selected to be about half of the length of horizontal travel of the primary axis pushrod. The horizontal travel of the primary axis push rod is associated with the length of the primary axis torque arm and the desired angular movement required of the primary axis to swing the solar collectors through an arc to sufficiently track the sun during daylight hours. In forms of the installation, the second movement module or second axis modules located along the primary axis are positioned to avoid shading to the extent of the mechanical travel of the axis.

Forms of the solar tracking installation have a drive assembly. Although the drive assembly can be any suitable or convenient arrangement, a typical drive assembly includes a primary drive and a separate secondary drive.

In one form, the primary drive for driving the main beam includes a crescent web having a trough, in which the trough is typically located around an edge, preferably an outer edge, of the crescent web. A driving element, typically in the form of a belt or similar, is located within the trough for cooperative engagement with a suitable drive element, typically in the form of a drive pulley, more typically, a toothed drive pulley.

The belt is tethered at one end of the trough to extend in the trough from one side edge of the crescent web to the other side edge of the crescent web. The teeth of the toothed drive pulley engage with the surface of the belt to drive the crescent web, which in turn is fixedly connected to the main beam or shaft forming the primary axis of movement for providing movement to the modules and/or panels.

Forms of the primary drive include idler rollers, idler roller shafts, a toothed drive pulley shaft and a high reduction gearbox, together with a flexible coupling or a universal joint.

In one form, the secondary drive includes a belt in the form of an endless loop for transmitting drive from a suitable drive member, such as a second axis screw drive connected via a reduction gearbox to a secondary shaft to move the solar collector panels about a second axis. Forms of the secondary drive include an electric motor, including a stepper motor, a reduction gearbox, a pair of toothed pulleys, universal joints or couplings for cooperation with each other for transmitting rotary motion of the motor through the second axis screw drive to the secondary axis drive shaft or tube to move the modules and/or panels.

In forms of the solar tracking installation the combination of the primary and secondary drive results in a dual axis tracking system enabling the photo voltaic panels to face towards the sun during daylight hours. Typically, the array of modules and panels has a range of motion from about−20' to about+55' in the north-south plane of the location of the solar tracking installation, and about ±450 in the east-west plane of the solar tracking installation. More typically, the accuracy of the position adopted by the panels has an accuracy of about ±−0.1'.

EXAMPLE 1

One form of a solar tracking installation will now be described with reference to FIGS. 5 to 12 of the drawings.

Generally, one form of the solar tracking installation, generally denoted as 2, includes a multitude of solar collector elements, typically in the form of solar panels 4 arranged in an array of spaced apart groups of panels 4, such that each group has two sets of three panels. Panels 4 are caused to move to track the sun by movement modules incorporated into installation 2.

One section of one form of the solar tracking installation 2, comprises a vertical support structure for supporting installation 2. One form of the vertical support structure includes a pair of posts or poles in substantially horizontally spaced apart relationship to one another in the form of two side by side beams 12, such as a pair of I-beams 12a, 12b extending substantially vertically from respective foundations. Typically, the foundation is in the form of a pair of spaced apart concrete columns or piles 14a, 14b for securely anchoring the pair of beams 12 at the required location to support installation 2. A spacer, in the form of a noggin 16, extends transversely from the respective inner facing surfaces of the pair of I-beams 12a, 12b to strengthen and rigidify the support structure. A top cap 18 extends transversely between the respective tops of the pair of I-beams 12a, 12b to form the support structure into a rigid box structure. A motor assembly, generally denoted as 20, is fixedly mounted to one of the pair of I-beams 12a, to fixedly locate motor assembly 20 within installation 2. Motor assembly 20 includes motor 22 that can be of any suitable or convenient form, typically in combination with a reduction gearbox, more particularly a high production gearbox, for significantly reducing the speed of rotation of output shaft 24 of motor assembly 20.

In one form, the reduction gearbox has a reduction ratio of about 1000 to 1 for reducing the speed of output shaft 24. However, gearboxes having other reduction ratios or other reduction ratios in the same gearbox are possible. The proximal end of motor drive arm 26 is fixedly connected to the distal end of output shaft 24 for rotation in accordance with corresponding rotation of output shaft 24, and the proximal or other end of motor drive arm 26 is pivotally connected by a pivot to one end of primary conrod 28 for allowing movement of the pivot. The other end of conrod 28 is pivotally connected to primary pushrod 30. It is to be noted that the plane of movement of conrod 28 extends in a substantially parallel plane to the plane of movement of pushrod 30. In operation, as motor 22 operates output shaft 24 rotates to cause rotation of arm 26 which causes rotation of one end of conrod 28 and linear movement of the other end of arm 26, to move pushrod 30 linearly.

It is to be noted that in a preferred form of the first movement assembly or module, the length of motor drive arm 26 is any suitable or convenient length, typically the length of the primary axis motor drive arm is at about 645 mm centres, which corresponds to 1290 mm on the primary axis pushrod.

Further, it is preferred that the extent of travel of the reciprocating end of motor drive arm 26 is about half of the travel of push rod 30.

The other end of pushrod 30 is provided with fixed yoke 32 having a pair of spaced apart legs extending outwardly from the end of pushrod 30. Link 34 is provided at one end with fixed yoke 36 having a pair of spaced apart legs extending outwardly from the end of link 34. The two pairs of legs of yokes 32, 36 are pivotally connected to one another for transmitting linear movement of pushrod 30 to link 34 so that link 34 also moves linearly. The other end of link 34 is fixedly connected to primary shaft by a suitable fitting, such as for example by a suitable bracket, typically, in one form of a flat plate 42 attached to one side of primary shaft 40 through suitable fasteners, such as screws of similar.

Primary shaft 40 which extends from one side of installation 2 to the other side of installation 2, in one form, is of a substantially square section profile or cross-section, preferably having longitudinally extending chamfered edges. Shaft 40 is journalled for rotation in two spaced apart bearings 44, fixedly connected to the top of respective I-beams 12a, 12b by suitable brackets 46. Typically, brackets 46 have a flat section for mounting on the sides of I-beams 12 and a circular housing 47 forming the race of the bearing. Bearings 44 can have any suitable or convenient form or be any desired type.

One preferred form of bearing 44 is a self-aligning bearing for accommodating minor misalignment of the orientation of the central longitudinal axis of primary shaft 40. One form of primary shaft 40 includes a multitude of individual sections assembled in end-to-end relationship to one another so as to extend collinearly in the lengthwise extending direction of the collection of the individual sections making up shaft 40 to provide a first movement or motion of the installation, and to provide for mounting of an array of solar collectors (to be described in more detail later) to the installation.

One form of bearing 44 will be described in detail later.

In one form, two adjoining sections of primary shaft 40 are joined in end-to-end relationship by a suitable coupling or coupler, typically in the form of a pair of melding plates 48a, 48b located in opposed relationship on opposite sides of shaft 40. In one form the coupling allows for slight adjustment of one section of primary shaft 40 and an adjoining section of primary shaft 40. In operation rotation of motor 22 causes corresponding rotation of primary shaft 40 to move the array of solar collectors in a swinging arc from side to side (to be described later).

Shaft 40 is supported by another support at a spaced location such as shown in FIGS. 1 and 2, in the form of another single I-beam 12c provided with self-aligning bearing 44.

A secondary movement arrangement or module will now be described for moving the array of solar collectors linearly in accordance with the height of the sun in an arcuate pathway as the earth travels with respect to the sun during daylight. The secondary movement module includes a second drive means in the form of a second motor assembly 60, comprising motor 62 and reduction gearbox 64 in combination for driving movement of the secondary axis of installation. Motor assembly 60 is fixedly connected to primary shaft 40 by downwardly depending bracket 66 to fixedly locate motor assembly 60. Motor 62 includes an output shaft which is fixedly connected to one end of second drive arm 68 for rotating this end of second drive arm 68. The other end of second drive arm 68 is pivotally connected to one end of crank 70 so that rotary motion is converted into linear motion to the other end of crank 70. In one form crank 70 has two portions 72, 74 inclined to each other to form crank 70 which includes a pair of spaced apart legs having a common pivot axis through primary shaft 40 so that crank 70 can pivot on shaft 40. One end of crank 70 is provided with pin 76a extending transversely between the pair of legs for connecting this end of crank 70 to secondary pushrod 80. In operation, when motor 62 is operated to rotate the output shaft, one end of conrod 68 rotates whilst the other end reciprocates to move crank 70 linearly to move pushrod 80 linearly. In forms of the secondary movement module, the length of the second drive arm 68 can be any convenient or suitable length. Typically, the length of the secondary axis drive arm is at about 300 mm centres on the motor drive arm corresponding to about 600 mm travel on the secondary axis pushrod.

A connection assembly for interconnecting primary shaft 40 and secondary pushrod 80 will now be described in detail. The interconnection assembly includes two similar connectors 82a and 82b located in side-by-side spaced relationship to each other with one connector 82a, being located at or towards one side of primary shaft 40 and secondary pushrod 80 and the other connector 82b being located on the other side of shaft 40 and pushrod 80. The pair of connectors are located in side-by-side relationship to one another in a configuration having an axis of symmetry aligned along the lengthwise extending axis of the primary shaft 40. Although connector 82 can have any suitable or convenient form or configuration, one preferred configuration is of a generally U-shape having an elongated web portion in the form of torque tube 84 located centrally between an outer side plate 86 and an inner arm 88 in which the outer side plate and inner arm are in substantially parallel spaced apart relationship to each other with both extending in a plane substantially perpendicular to the lengthwise extending axis of central torque tube 84. It is to be noted that in forms of the installation the function of torque tube 84 is to provide a rigid transfer of the force on the top of inner arm 88 to the centre of gravity of the assembly to which it is connected as will be described in more detail later in this specification.

Outer side plate 86 is fixedly connected to a framework member in the form of an elongate rail 90 for forming a frame for supporting solar panels 4 (omitted from FIGS. 2 and 4). Central torque tube 84 is provided with a planar bracket 92 extending substantially perpendicular to the longitudinal length of central torque tube 84 for use in attaching elongate rail 90 to connector 82. Inner arm 88 of connector 82 is pivotally connected to secondary pushrod 80 such that linear movement of pushrod 80 causes corresponding tilting movement of connector 82 to tilt the solar collectors mounted on the pair of spaced apart rails 90a, 90b to track the position of the sun.

A second similar assembly is located on the opposite side of primary shaft 40 to facilitate tilting movement of a second set of solar panels 4 in unison with the first set of solar panels 4 in response to movement of second motor 66. A stabiliser in the form of a single crossbar 96 is located in spaced apart substantially parallel relationship to the pair of connectors 82a, 82b for assisting in facilitating movement of the two sets of solar collectors in unison with each other. In one form crossbar 96 extends transversely from the outer side plates 86 of each of the pair of connectors 82.

In one form crossbar 96 has an elongate central section in the form of a square or rectangular section or profile 97 with a upwardly extending flange 98a, 98b located at either end of the central section for attaching the ends of crossbar 96 to the respective outer side plates 86 of connectors 82 and to the respective rails 90a forming the frame of the solar collector panels 4. It is to be noted that flanges 98 are generally perpendicular to the lengthwise extending central axis of the central portion 97. A mounting bracket 100 is located about the midpoint of the central section for use in attaching crossbar 96 to either side of primary shaft 40 and to the respective inner sides 88 of the pair of connectors 82a, 82b. In one form mounting bracket 100 is of a yoke arrangement having a generally H-shaped form of two upwardly extending legs 102a, 102b and a central transversely extending web 104 extending between the respective inner sides of the two upwardly extending legs 102a, 102b. A pair of right-angle sections, 106a, 106b, are located in opposed face-to-face relationship at either side of mounting bracket 100 where the transverse web section 104 joins with the upwardly extending legs 102a, 102b, particularly the upper portions of the upwardly extending legs.

In one form, the function of the torque tube is to provide a rigid transfer of the force on the top of inner arm 88 to the centre of gravity of the assembly comprising the components identified by reference numerals 90a, 90b, 88, 86, 84, and 92 (82) together with the three solar collector panels and fixings. Torque tube 84 combined with rails 90a, 90b and outer side plates 86 also create a rigid mounting with elongate rails 90a, 90b relatively in order to reduce twisting of the solar collector modules.

Other assemblies similar to the overall assembly are provided at spaced apart locations over the entire area of installation to form an array of a multitude of solar panels.

Figure 7:
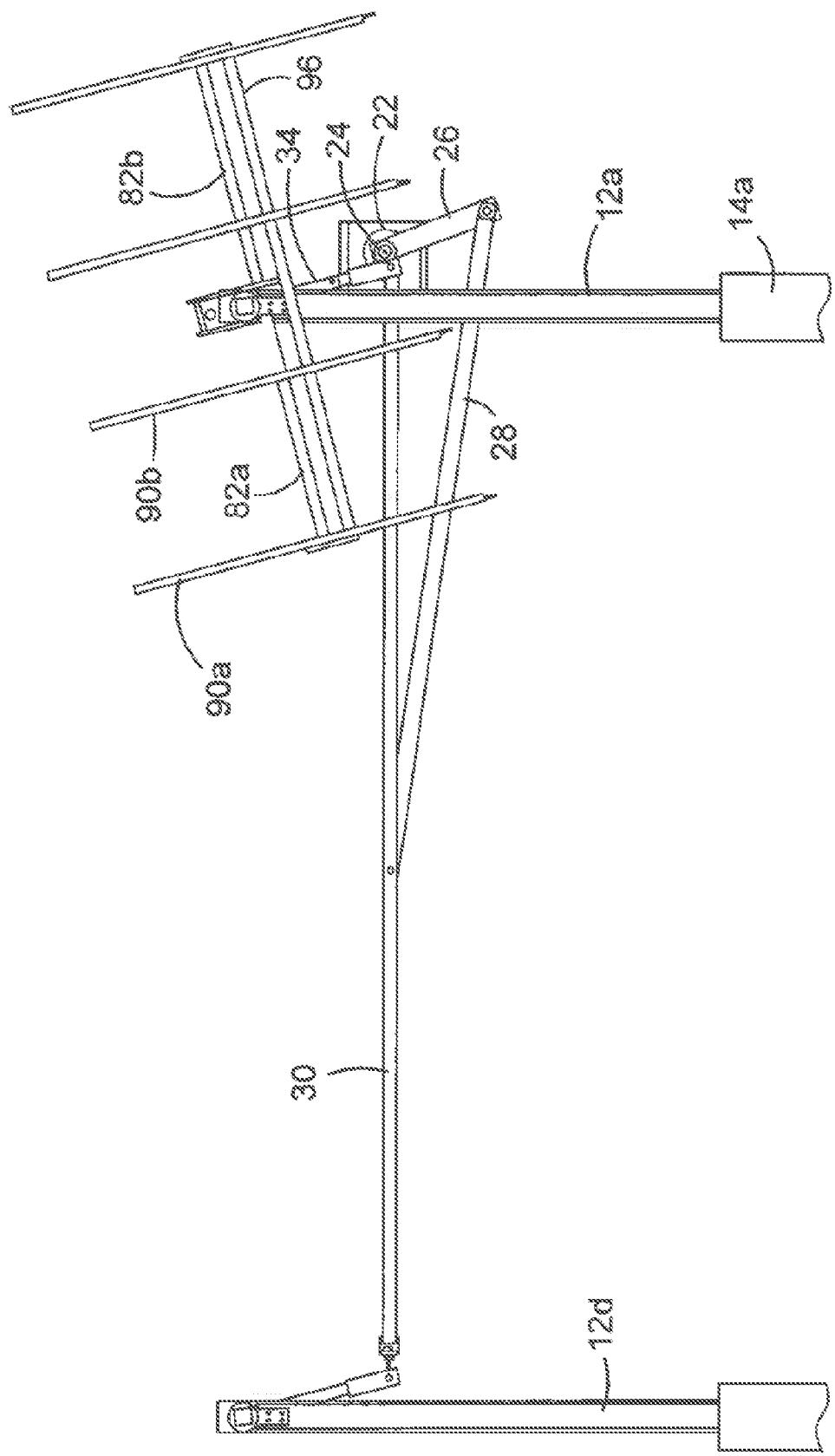
FIG. 7 is a schematic side elevation view of one form of the first movement module.
Figure 8:
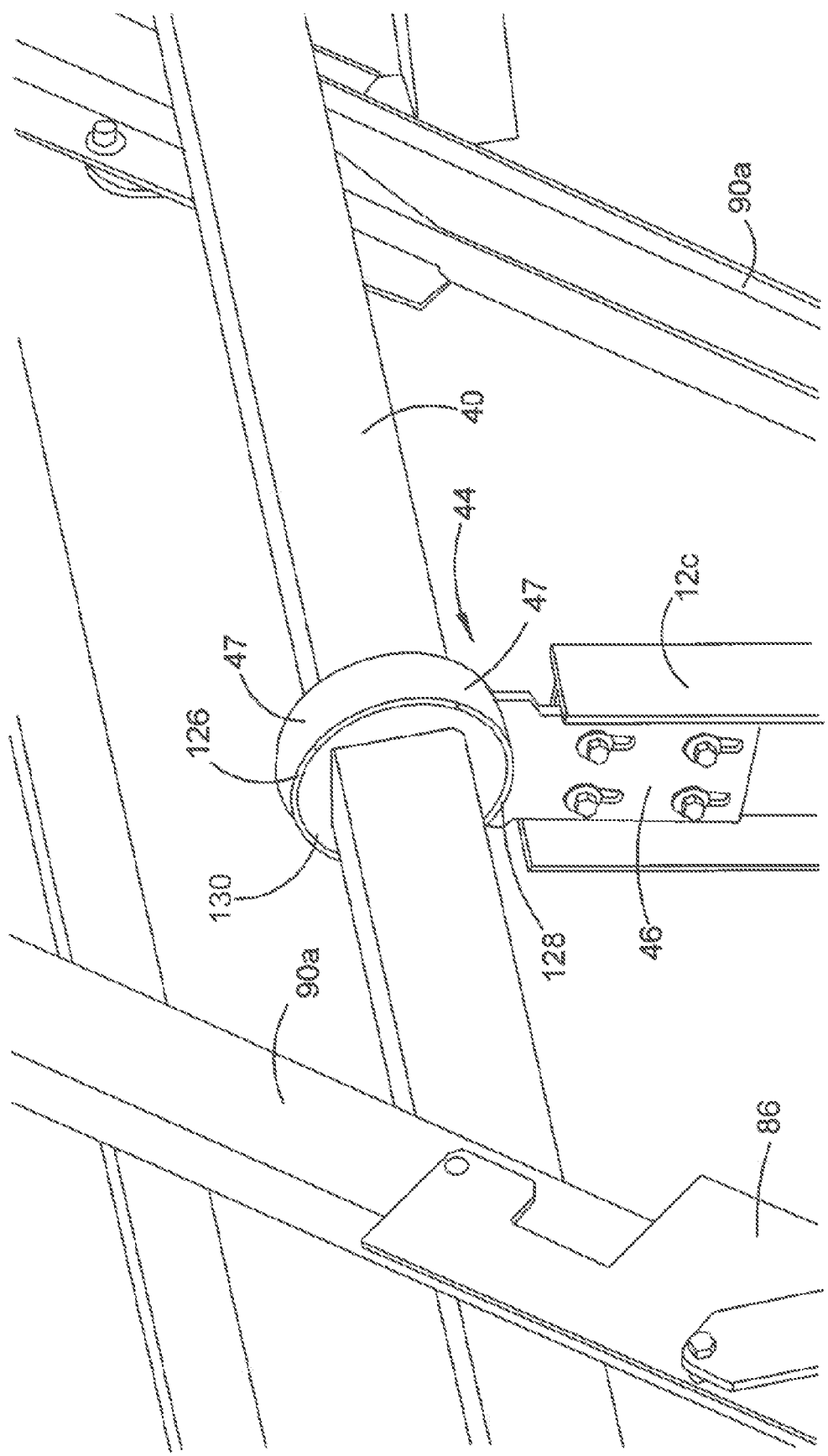
FIG. 8 is an enlarged schematic perspective view of one form of the bearing in which the primary axis shaft is journalled.
Figure 9:
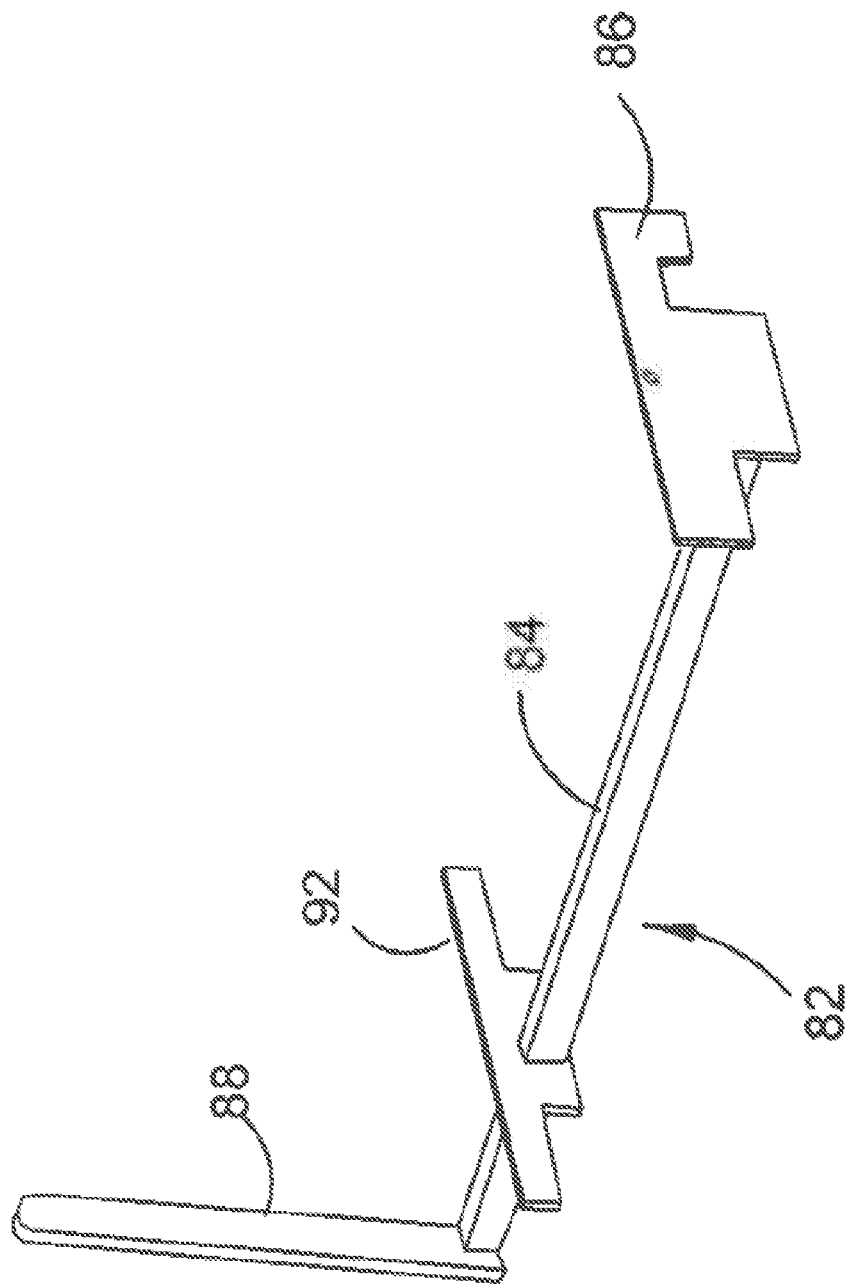
FIG. 9 is a schematic perspective view of one form of a connector.
Figure 10:
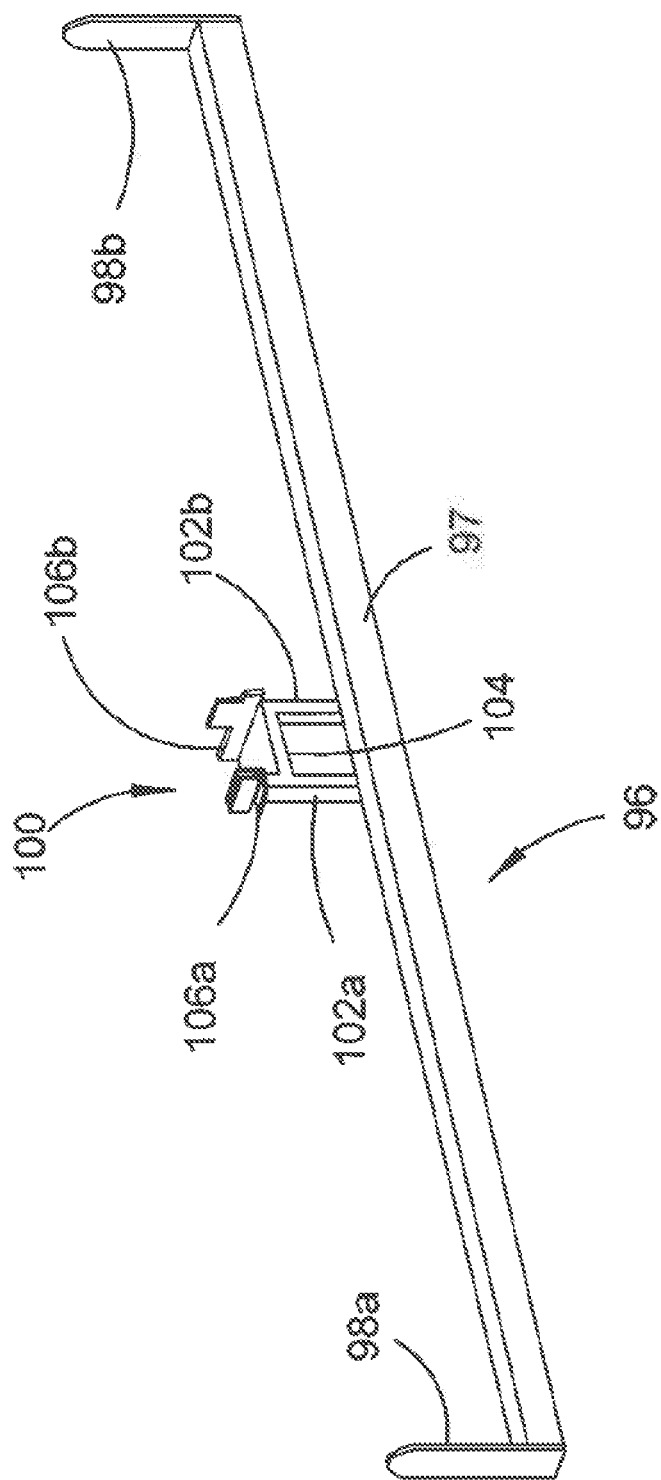
FIG. 10 is a schematic perspective view of one form of a stabiliser.
Figure 11:
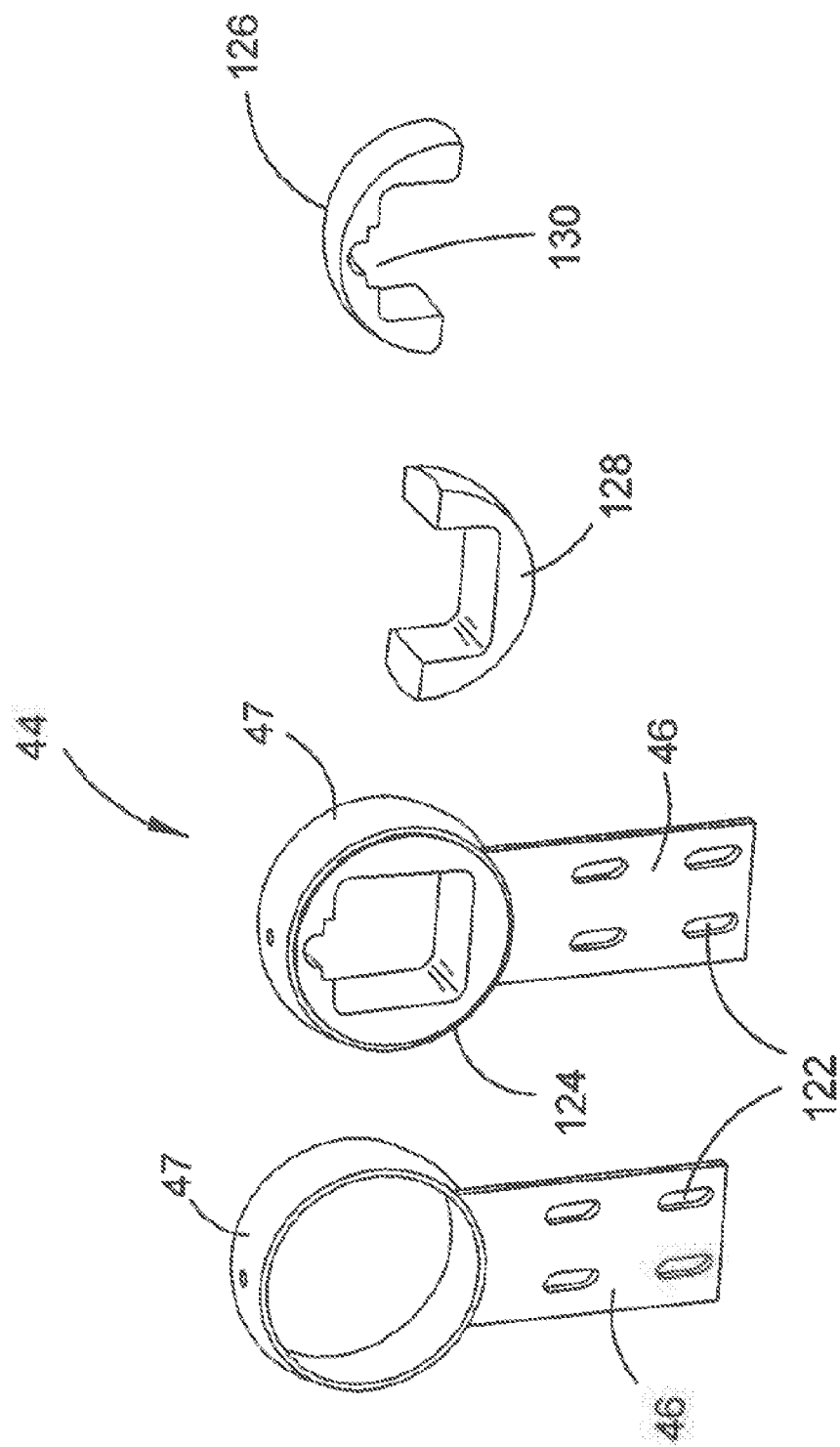
FIG. 11 is an exploded schematic top perspective view of one form of the self-aligning bearings.

One form of self-aligning bearing 44 and its method of assembly will now be described with particular reference to FIGS. 7 and 8.

Bearing 44 includes flat attachment plate 46 having a multitude of apertures in the form of slots 122 for attaching bearing 44 to the top of I-beam 12. A circular housing 47 in the form of a ring, typically made from SS304, is formed at or towards one end of plate 46. Housing 47 has a generally spherical shape in the axial direction, preferably a wholly spherical shape, so that the housing varies in length in the radial direction. One form of the curved profile is a generally dome shape or other arcuate shape, such as a spherical or part spherical shade, preferably wholly spherical.

The arcuate profile facilitates the bearing being a self-aligning bearing by allowing bearing insert 124 located within housing 47 to swivel to some extent.

Insert 124 has an upper part 126 and a lower part 128 which fit together to form insert 124 about the mid plane of insert 124. Upper part 126 is provided with an upper edge or side in the form of a complex shape. One form of the complex shape is a stepped profile including a centrally located groove 130 having a shoulder 132a, 132b on either side, and flat sections 134a, 134b extending to respective side surfaces 136a, 136b.

Groove 130 provides clearance for receiving electrical conductors therethrough, such as cabling of the installation.

It is to be noted that central groove 130 is sized so as to be able to pass a pre-terminated industry standard MC 4 connector through the bearing housing. Further, side grooves formed by shoulders 132a, 132b are to facilitate cables previously run through the installation to be relocated to the side of the central cable for allowing passing of additional pre-terminated connectors of other cables.

In one form insert 124, including upper part 126 and lower part 128, are made from any suitable plastics material having the required properties and/or strength. Preferably, the plastics material is ultra-high molecular weight polyethylene of about 30 Mpa hardness or other similar suitable materials such as ultra-high molecular weight polyurethane.

Forms of the insert are made from high molecular weight polyethylene or similar materials.

In operation movement of motor 22 causes side to side motion of primary shaft 40 whereas movement of motor 66 causes linear movement of secondary shaft to tilt the solar panels upwards and downwards so that the combined movement of the solar panels is a combination of both the arcuate swinging movement from side to side and the up and down tilting movement.

EXAMPLE 2

A further embodiment of the solar tracking installation will now be described with reference to FIGS. 13 to 21 of the accompanying drawings, which generally illustrate another form of the tracker subassembly of the installation, which tracker subassembly provides combined movement of the solar panels due to movement of the first or primary axis combined with movement of the second or secondary axis to cause the solar collector panels to move in accordance with movement of the sun so that the solar collector panels face towards the sun, thereby improving the efficiency of the solar collector installation. This embodiment is a modified form of the embodiment described above and is in part substantially the same as the previously described installation, and in part, is different, particularly relating to the drive arrangement for driving the main being and the secondary beam of the installation as will be described more fully below.

The further embodiment of the dual axis tracking array includes the following components, arrangements, subassemblies and similar, which are arranged with respect to one another to form the dual axis tracking array. It is to be noted that while some components of the other form of the solar tracking installation are different to the corresponding forms of the components of the previously described solar tracking installation as indicated above, other components are the same as or similar to the corresponding components of the previously described solar tracking installation.

Overview of the other form of solar tracker installation the tracking assembly 218 of this modified form of the solar track installation 202 is an arrangement of up to 48 horizontal rows or primary beams 240 that run east-west and pivot atop supporting posts 208 for supporting tracking assembly 218 to achieve rotation of the arrays of PV panels 204 in the north-south plane. On each primary beam 240, up to 16 modules 206 of panels 204 are mounted to pivot at 90 degrees to the primary beam. The modules 206 on each row are mechanically linked with a pushrod 250 from underneath. By the combination of the entire primary beam 240 tilting together with the linked modules 206 on the beam pivoting in unison, dual axis tracking is achieved. Due to spacing of the PV panels 104 of the modules 206 being optimised for efficiency, and the ability of the tracking assembly 218 to avoid shading by backtracking in both axes, a very high yield of energy is derived from the PV panels 204.

Each module 206 carries 6 PV panels 204 of typically 300 watts each which yields an output of about 115 kw per row.

Rows-Primary axis:

The rows are typically a SHS (square hollow section) of about 68 m in length and are mechanically positioned with a belt drive crescent assembly 210 responsible for the tilting movement of the panels. In one form, the crescent assembly 210 includes a crescent web 212 which has a 1.5 m radius trough 216 for receiving and locating therein a belt 214 for driving movement of the beam 240 and of the panels 204. The trough 216 faces towards the ground underneath the assembly 210, thereby shading the belt from the weather. In one form the belt 214 is tethered at each end to the crescent 212. The belt extends under idlers, in the form of idler rollers 220 or similar, by extending under one idler 220, out of the trough 216 over a toothed drive pulley 222, and back under the other idler to be re-received within the trough 216. Belt tension is achieved with eccentric mounting of the idler shafts 224. The toothed drive pulley and the idlers are mounted on shafts 224 that transverse the two centre posts 208*a*, 208*b*. The mounts on each post 208*a*, 208*b* allow for the alignment of the shafts.

The idler shafts are rigidly mounted at both ends as the idlers turn on their shafts. The toothed drive pulley shaft is mounted at one end in a high reduction gearbox (not shown) with the other end in a polymer self-aligning plain bearing.

The gearbox input shaft runs through the gear box allowing the twisting drive shafts to be connected to the next row of panels. The twisting drive shafts can connect with either a flexible coupling or a universal joint 226. This is determined by the degree of alignment to the adjacent rows. The resultant drive system can provide enough torque to allow operation in conditions of up to 30 m/s wind speed.

Figure 15:
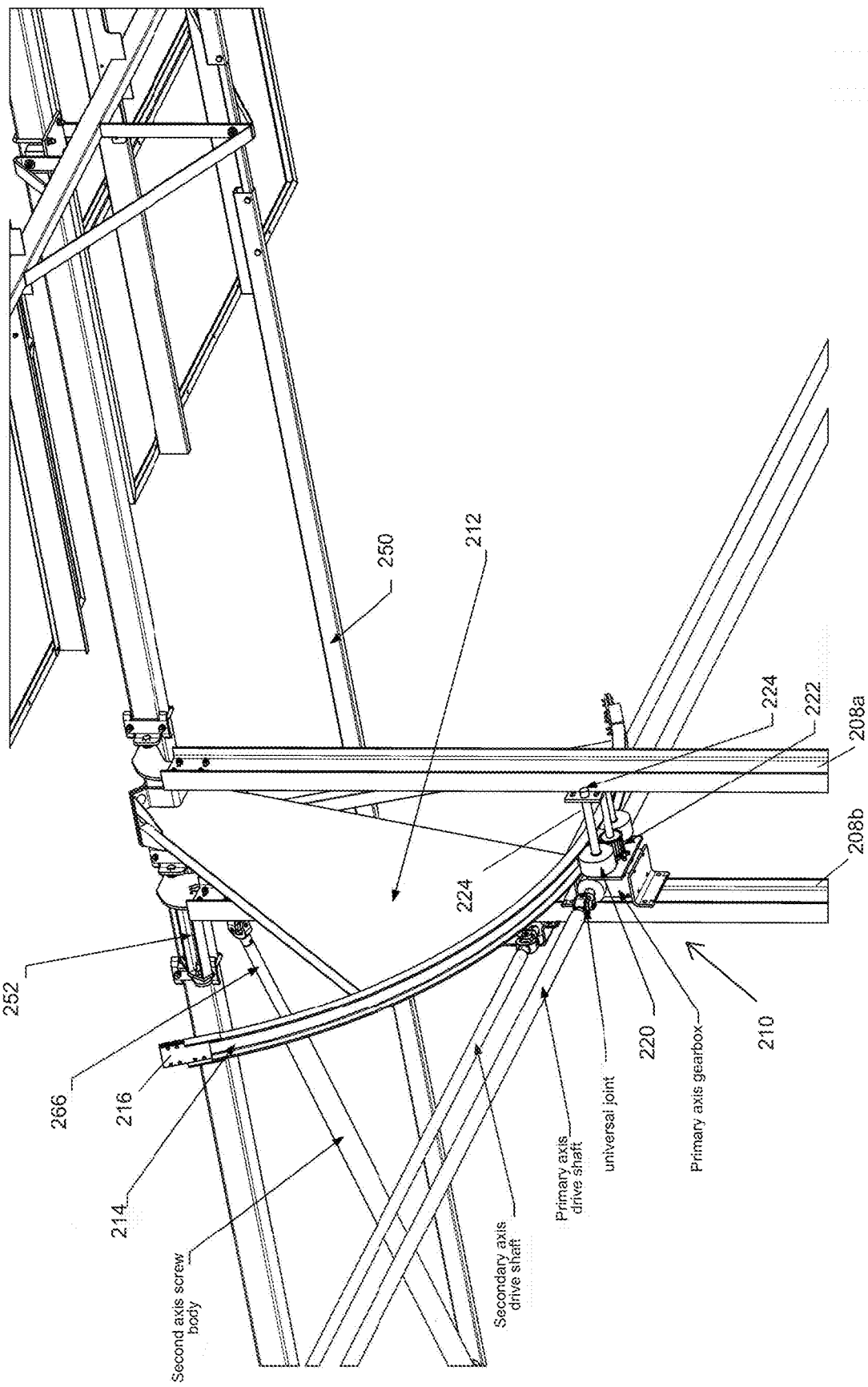
FIG. 15 is a more detailed schematic view of one form of the primary axis drive for moving the main beam of the form of the solar tracking installation of FIG. 13 when viewed from one side underneath the main beam.
Figure 16:
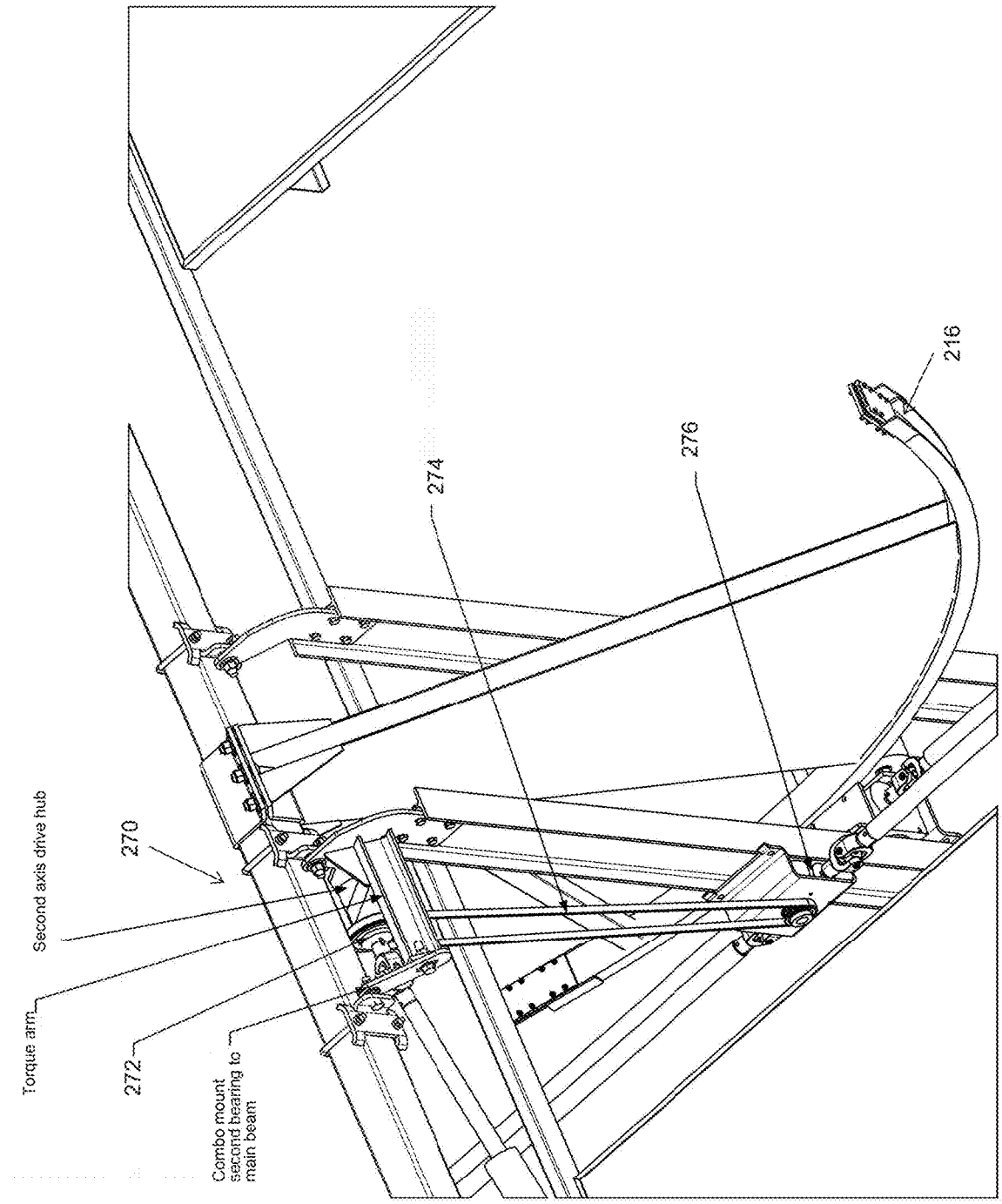
FIG. 16 is a more detailed schematic view similar to FIG. 15 showing additional details of the primary axis drive for moving the main beam when viewed from another side above the main beam.
Figure 17:
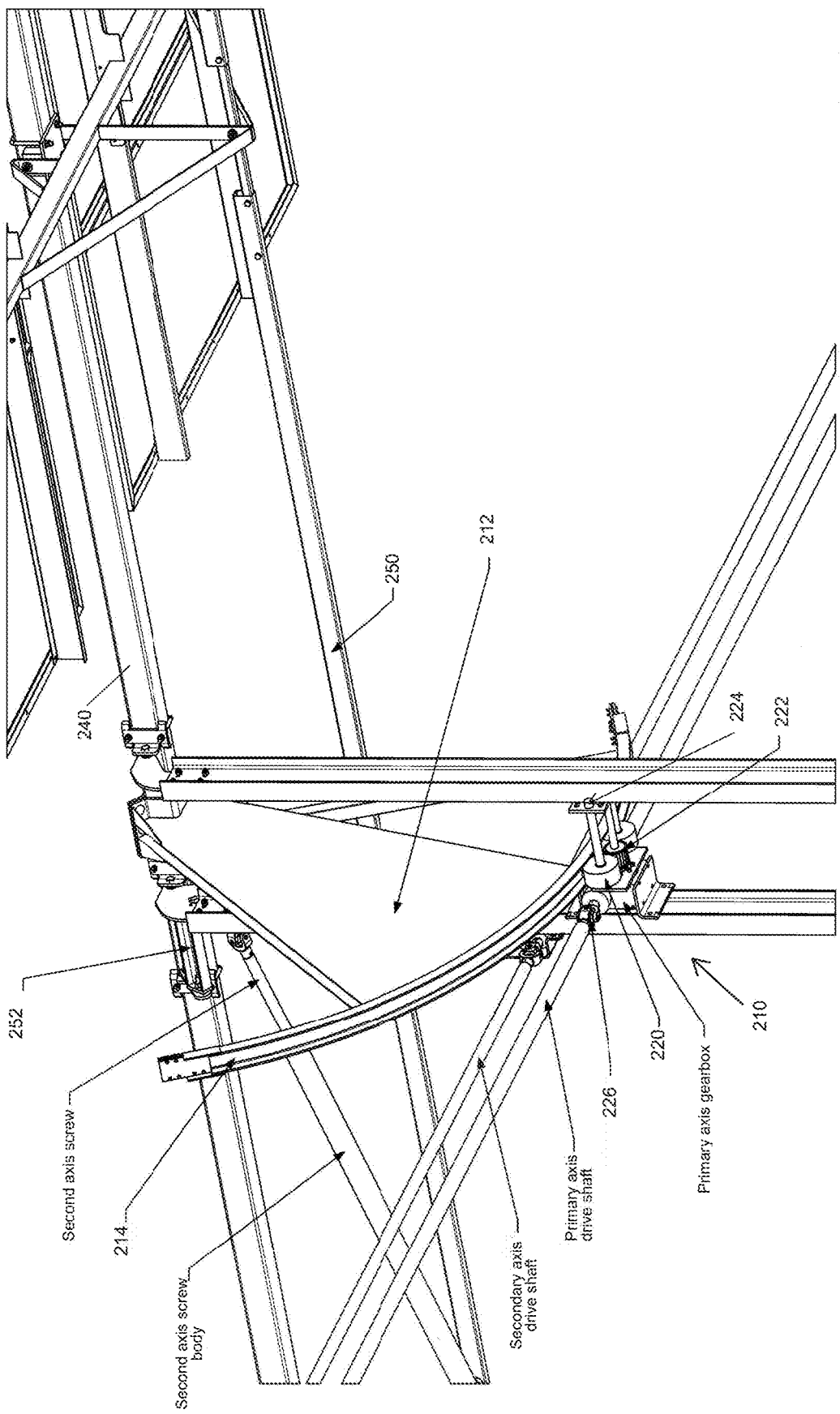
FIG. 17 is a more detailed schematic view of FIG. 15 from the same side as FIG. 11 showing further detail of the primary axis drive.
Figure 18:
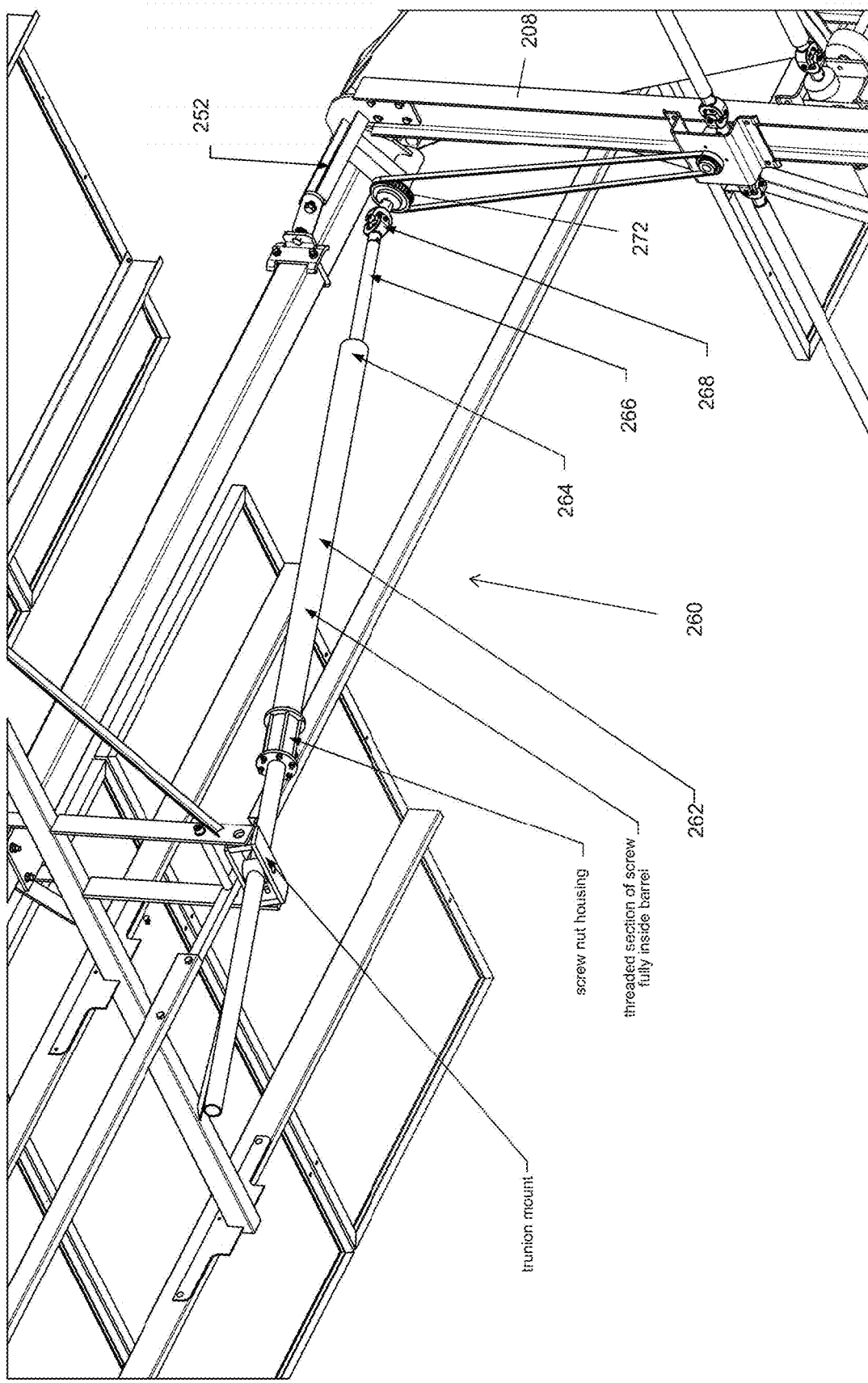
FIG. 18 is a schematic perspective view of one form of the secondary drive axis of the form of the solar tracking installation shown in FIG. 13 when viewed from underneath the array of solar collector panels.
Figure 19:
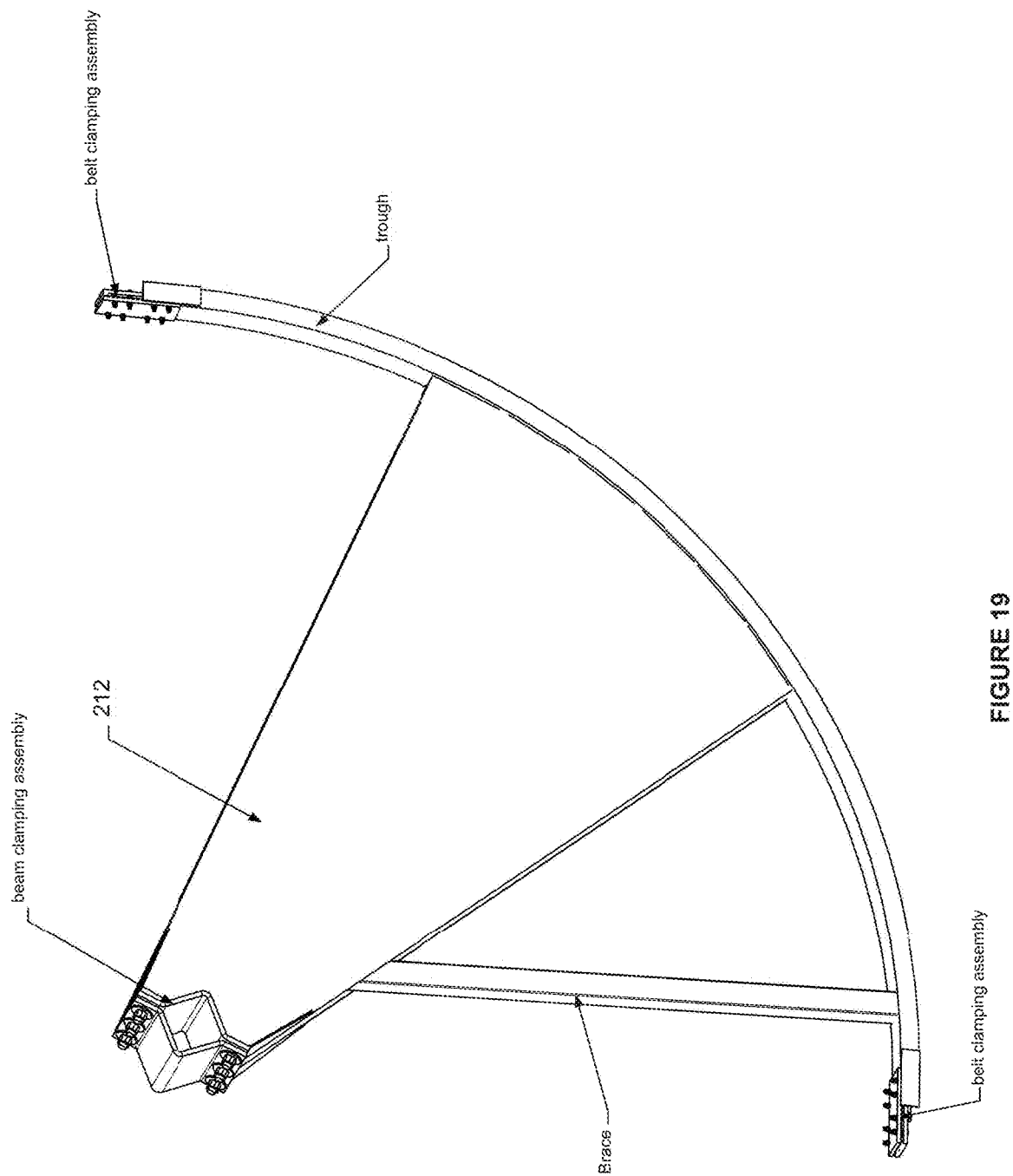
FIG. 19 is a schematic side view of one form of the crescent web forming part of the primary drive axis of the form of the solar tracking installation shown in FIG. 13 showing the beam clamping assembly at the centre of the crescent web and belt clamping assemblies located at either end of the trough.

In this form, rotary drive from the output shaft of the reduction gearbox is transmitted to a primary axis drive pulley, which in turn cooperatively engages with the belt within the trough of the crescent web or sector plate to move the sector plate or crescent web in a generally arcuate motion or movement. As the sector plate or crescent web is fixedly attached to the main beam by a beam clamping assembly, typically in the form as shown in FIG. 15, movement of the sector plate or crescent web causes corresponding rotation of the main beam which in turn causes corresponding pivoting movement of the photovoltaic solar collector panels to face towards the sun.

All posts 208 for supporting the primary shaft 240 are the same and are spaced apart at about 4.5 m centres between modules 206 and 0.5 m for the centre pair of posts 208*a*, 208*b*. The main beam is mounted to the posts via a maintenance free spherical plain bearing assembly 230. The beam is provided with brackets in which each bracket is fixed to the beam with a U-bolt 234. The bracket has alignment lugs and a perpendicular flange provided with an opening in the form of a hole. The hole in the flange allows for the centre of the bearing to be fixed with a bolt. The bearing is mounted in a bush that is forged into the post bearing flange 236. The post bearing flange 236 is precisely positioned with slotted holes in both the post and the bearing flange. A bearing mount of this type is required to distribute the wind loadings across all posts.

The Modules-Secondary Axis

The modules 206 which are mounted on the main row beam 240 carry the solar PV panels 204. The modules pivot in a direction which is perpendicular to the lengthwise extending axis of the main beam and are linked to one another with a secondary pushrod 250 from underneath so as to be able to pivot in unison with each other. The module has a main crossbar 284. The crossbar is a truss that has flanges, pivot arms and a lever web. In one form there are four flanges. The four perpendicular flanges on the crossbar have channels riveted to them to create two rows of three PV panel mounting. The crossbar is pivoted on a saddle 232 that is connected to the main beam by U-bolt 234. The module pivots are maintenance free spherical plain bearings mounted in bushes that are forged into the crossbar pivot arms. The saddle is a plate with alignment lugs and holes for receiving two U-bolts. Welded to it are two perpendicular channels that have holes where the pivot bearings bolt through. The holes are located to achieve the vertical centre of gravity of the assembled main beam.

The length of the crossbar and the offset mounting of the northern PV set achieve the centre of gravity of the complete main beam in the horizontal direction. The same maintenance free spherical plain bearing is mounted with a bush in the lever web at the bottom of the truss. This is connected to the secondary axis pushrod with a bolt and a spacer washer.

Modules (secondary axis) Push rod:

The secondary axis pushrod 250 is a simple series bolted RHS (rectangular hollow section) and SHS assembly that runs as one piece from the first to the last module on each primary beam. The centre driver link is solid bar-stock. At each module, the pivot bearing centre is rigidly bolted through the SHS.

Secondary axis drive screw:

The secondary axis drive screw assembly 260 is built using maintenance free bearing elements. The body or nut does not rotate and is trunnion mounted into the truss of the centre module. The body section has an extended barrel 262 that houses an outrigger bush 264 at the screw drive end. The bush mounting position supports the shaft from buckling and covers the screw 266 to prevent damage and contamination. The body extends the opposite end to provide the lower trunnion mounting point and to enclose the tail end of the screw. The screw is driven via a universal joint 268 which provides axial load restraint created from wind loading in tension and compression. Positioning forces for low or no wind are very low as the assembly 260 is neutrally balanced. The screw nut is made of low polymer with a coarse trapezoidal thread form.

Trunnion pivots are plain polymer bushes onto the screw body and MF spherical plain bearings at each end of the trunnion.

Secondary axis torque cancelling the axial forces developed in positioning the secondary axis pushrod 250 create a large torque that would be concentrated on the centre post 208*a*, 208*b*. To cancel out this torque on the post, the torque has been directed through the main beam 240. This is achieved with the centre combo mount 252. The combo mount 252 has a torque arm and a secondary bearing onto the main beam. The axial forces generated from the secondary axis pushrod 250 are resolved into a force triangle consisting of, the secondary axis screw assembly 260 the first module lever arm (part of the crossbar) the section of the main beam 240 between the combo mount 252 and the first module mounting saddle 256.

The combo mount 252 bridges between the main beam pivots and the secondary axis drive hub.

Secondary axis drive assembly:

The secondary axis drive assembly 270 includes a secondary axis drive screw 266 which is driven by a universal joint 268 mounted on a stub axle housed in the combo mount 252. The stub axle runs in two angular contact bearings in a sealed housing.

The stub axle has a toothed pulley 272. Using belt 274, the pulley 272 is belt driven from another pulley on a high reduction gearbox 276 mounted lower down on the post.

The gearbox 276 is arranged like that of the primary axis in that the input shaft passes through the gearbox 276. The input twisting drive shaft is then connected to adjacent rows with either flexible couplings or universal joints. The belt drive is enclosed in a sheet-metal cover and the belt tension is adjusted by moving the gearbox, as shown more particularly in FIGS. 11, 12 and 14.

Figure 12:
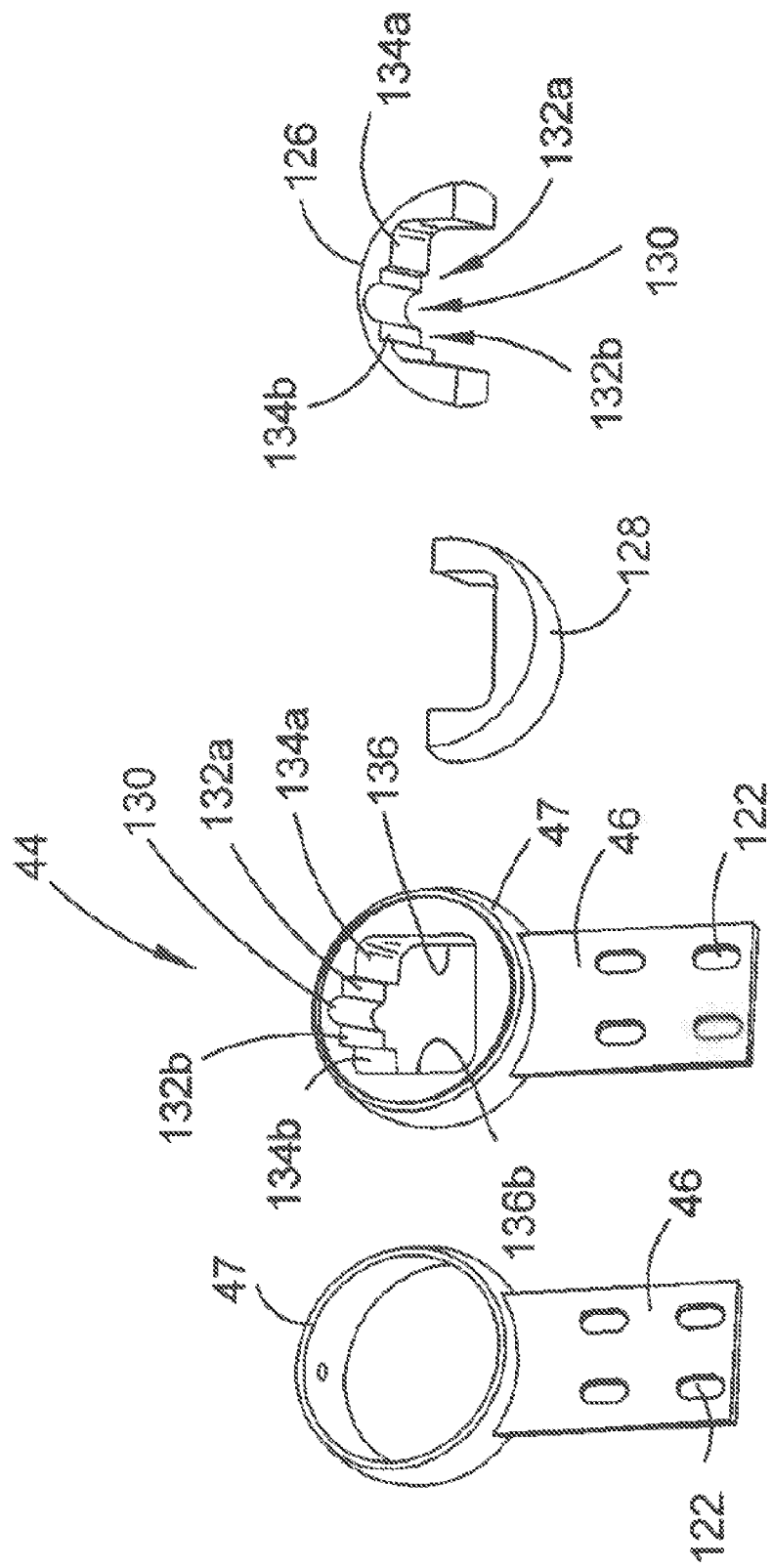
FIG. 12 is an exploded schematic bottom perspective view of the form of the self-aligning bearing of FIG. 11.
Figure 14:
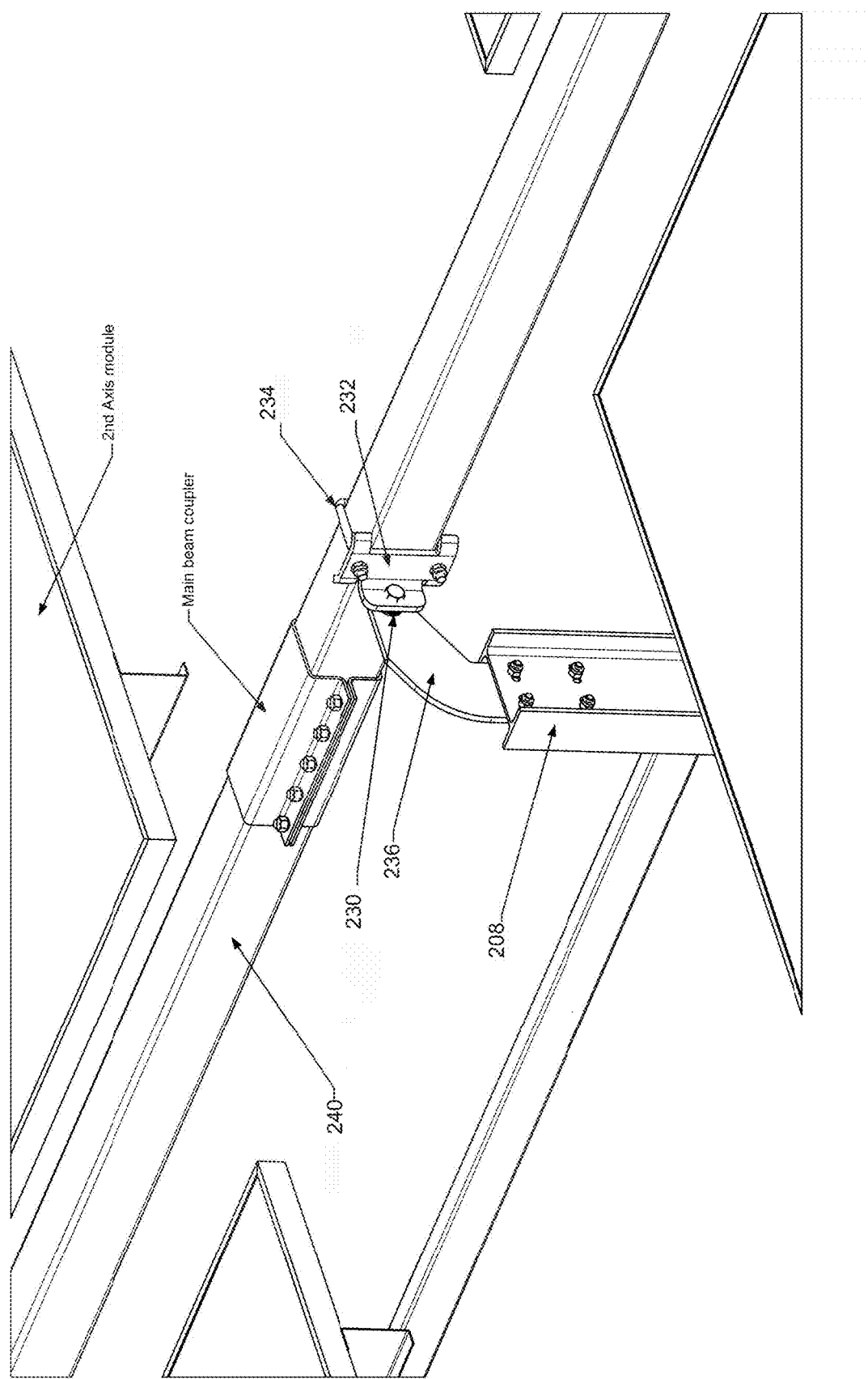
FIG. 14 is a close-up view of the installation of FIG. 13 showing one form of the connection of the main beam to a support post using a curved pivot flange extending from the top of a support post to the main beam.

In this form, drive from rotation of the output shaft of secondary axis gearbox 276 is transmitted to one of the toothed pulley wheels, being the lower pulley wheel 278 as illustrated in FIGS. 12 and 14, and to the other of the 2 pulley wheels, being the upper toothed pulley wheel 272, as illustrated in FIGS. 12 and 14, via the endless belt drive extending there between, being secondary axis drive belt 274, to rotate the shaft upon which upper pulley 272 is mounted for driving the array of solar collector panels.

Rotation of upper drive pulley 272 causes rotation of second axis screw drive 266, which is received within barrel 262 for rotation. Second axis screw drive 266, in turn, is connected to the trunnion mount of the array of photovoltaic panels to tilt the panels to face the sun in accordance with corresponding rotation of second axis screw 266.

Thus, movement of the photovoltaic panels is a combination of the movement provided by the first drive and the second drive as described above.

Range of motion the combination of the primary and secondary linked rows creates a dual axis tracking system. The array has a range of motion of –20 to +55 degrees in N-S plane and ±45 degrees in the E-W plane, with a positioning accuracy of ±0.1 degree.

Drive A first single motor drives all the components of the primary axis. A second single motor drives all of the components of the secondary axis. Each motor developing about 2.2 kw at about 200 rpm. Position feedback for the entire array is from a 2-axis inclinometer. This single solid-state device is the only sensor required for an installation of up to about 1.5 MW of tracking array.

Stowage Due to the drive arrangement, the array can be set to the stowage position within 2 minutes to avoid damage from adverse weather conditions, such as for example from excessive wind.

Tracking is performed with a theoretical sun path as calculated from an algorithm. A secondary tracking layer can be employed with a brightest point in the sky system based on feedback from several insolation sensors.

EXAMPLE 3

A further embodiment of the solar tracking installation will now be described with reference to FIGS. 22 to 23 of the accompanying drawings.

It can be seen that referring to the Figures, the installation includes first movement assembly 20 which functionally engages with the primary axis shaft 40 to cause rotation of the primary axis shaft 40 around the primary axis for moving the plurality of planar modules of solar collector elements 4 in a first rotational direction around the primary axis. The installation further includes a second movement assembly 60 which functionally engages with the secondary movement member 80 to cause tilting of each of the plurality of planar modules of solar collector elements 4 around each respective pivotal mount 56, 256. In this way the movement of the multitude of solar collection elements is a combination of the rotation of first movement assembly and the tilting motion caused by the second movement assembly. The first movement assembly includes at least one driving means to selectively drive rotational motion of the primary axis shaft 40 to move the array of solar collector panels 4 in a generally rotational direction around the primary axis. The second movement assembly 60 includes at least one driving means to selectively drive linear motion of the secondary movement member 80 to cause tilting of each planar module 4 around each respective pivotal mount 56, 256.

At least one driving means includes a motor to move the primary axis shaft 40 to move the array of solar collector elements 4 in a first direction or the secondary movement member 80 to move the array of solar collector elements 4 in a second direction, wherein movement of the array of solar collector elements 4 is a combination of the first motion and the second motion for facilitating location of the array of solar collector elements being directed to the sun.

Along a primary axis shaft 40 is a plurality of spaced primary or secondary movement assembly 20, 60 so as to effect operation at different points along the primary axis shaft 40. This means that each planar modules of solar collector elements 4 is actioned in unison. However, each primary or secondary movement assembly 20, 60 need not have a drive motor. Instead they can have a drive assembly that functionally engages an interconnecting driving member 30, 50 from another primary or secondary movement assembly 20, 60 to effect the drive on the respective primary axis shaft 40 or respective secondary movement member 80.

In this form there is use of a primary movement assembly 20 in the form of a crescent assembly 210 including a crescent web 212 which has a 1.5 m radius trough 216 for receiving and locating therein a belt 214 for driving movement of the beam 240 and of the panels 204. The trough 216 faces towards the ground underneath the assembly 210, thereby shading the belt from the weather. In one form the belt 214 is tethered at each end to the crescent 212. The belt extends under idlers, in the form of idler rollers 220 or similar, by extending under one idler 220, out of the trough 216 over a toothed drive pulley 222, and back under the other idler to be re-received within the trough 216. Belt tension is achieved with eccentric mounting of the idler shafts 224. The toothed drive pulley and the idlers are mounted on shafts 224 that transverse the two centre posts 208a, 208b. The mounts on each post 208a, 208b allow for the alignment of the shafts.

Other elements and embodiments of the invention would be understood by the person skilled in the art.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be understood to persons skilled in the art of the invention that many modifications may be made without departing from the spirit and scope of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the description provided herein, numerous specific details are set forth. However, it is understood that embodiments of the invention may be practiced without these specific details. In other instances, well-known methods, structures and techniques have not been shown in detail in order not to obscure an understanding of this description.

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

It is apparent from the above, that the arrangements described are applicable to the solar power industries.

The invention claimed is:

1. A solar tracking installation having solar collection elements arranged in an interconnected array for movement in unison with each other so as to be directed toward the sun during daylight hours, comprising:
    a support structure for supporting the solar collection elements above a ground, the support structure comprising spaced apart and vertically extending support posts;
    a beam supported via the support posts and being movably mounted relative to respective upper ends of the support posts;
    support arms having a downwardly extending first end for engaging respective support posts and a second end extending in a direction that is generally perpendicular to both the first end and the support post to which it is engaged such that a distal portion of the second end is laterally offset from and does not overlie the respective support post, the second end being configured to maintain the beam in a position that is laterally spaced from the support posts wherein the beam is pivotal about a pivot axis extending parallel to the beam and through the distal portions of the respective support arms such that the beam is movable through an arcuate path which includes a position wherein the longitudinal axis of symmetry of the beam and the pivot axis lie in a plane that is generally parallel to and laterally offset from the vertically extending support posts;
    planar modules of solar collector elements spaced apart along the beam, each module being configured to tilt about respective axes that are generally perpendicular to the beam;
    a secondary movement member extending parallel to the beam and being operable to tilt the modules;
    a first movement assembly configured to pivot the beam about the longitudinal axis extending parallel thereto so as to effect movement of the modules through an arcuate path; and
    a second movement assembly configured to move the secondary movement member to tilt the modules;
    wherein in use, the secondary movement member is configured to underlie the beam and be laterally spaced from respective support posts when the modules are substantially parallel with the ground.

2. An installation according to claim 1 wherein the first movement assembly includes a first driving means configured to pivot the beam.

3. An installation according to claim 2 wherein the second movement assembly includes a second driving means configured to drive linear motion of the secondary movement member to tilt each planar module.

4. An installation according to claim 3 wherein the orientation of the first and/or second driving means is along an axis that is substantially perpendicular to the beam.

5. An installation according to claim 3 wherein the first driving means includes a first motor or linear actuator to pivot the beam to move the array of solar collector elements in a first direction forming a first part of a motion of the array.

6. An installation according to claim 5 wherein the second driving means includes a second motor or linear actuator to move the secondary movement member to move the array of solar collector elements in a second direction forming a second part of the motion of the array, wherein movement of the array of solar collector elements is a combination of the first motion and the second motion for facilitating positioning of the array of solar collector elements being directed to the sun.

7. An installation according to claim 1 including:
- a plurality of beams arranged parallel to one another wherein the solar collection elements are arranged in an interconnected array on the beams;
- a plurality of secondary movement members each related to a respective beam;
- first movement assemblies and second movement assemblies on respective beams; and
- interconnecting driving members interconnecting at least one driving means on one beam with at least one of the first and second movement assemblies on an adjacent beam such that pivoting of one beam drives the first movement assembly on an adjacent beam and driving of the second movement assembly on one beam drives a second movement assembly on an adjacent beam;
- wherein movement of a first movement assembly on a first beam moves the array of solar collection elements in a first direction and movement of the second movement assembly moves the array of solar collection elements in a second direction, the movement of the array of solar collection elements being a combination of movement in the first direction and movement in the second direction.

8. An installation according to claim 1 wherein:
- the first movement assembly includes a first driving arrangement for driving a primary movement member to pivot the beam;
- the second movement assembly includes a second driving arrangement for driving the secondary movement member to tilt the modules, the second driving arrangement rotatably fixed at one end to the support structure and configured for driving the secondary movement member in the second direction upon rotation; and
- the second driving arrangement and the primary movement member are movable in unison in response to corresponding movement of the first driving arrangement.

9. An installation according to claim 8 including an intermediate connector interconnecting the primary movement member and the secondary movement member and acting as a mechanically linked actuator, respective solar collector elements being fixedly connected to the intermediate connector for movement therewith, wherein movement of the primary movement member in response to corresponding movement of the first driving arrangement moves the intermediate connector so as to pivot the solar collector elements along the arcuate path, and movement of the second driving arrangement moves the intermediate connector so as to tilt the solar collector elements.

10. An installation according to claim 1 wherein the beam is engaged with respective second ends of the support arms via respective bearing assemblies.

11. An installation according to claim 10 wherein the bearing assemblies comprise respective spherical bearings formed in the second end of respective support arms, the beam being pivotal about an axis extending through the spherical bearings such that the beam is movable through the arcuate path.

12. An installation according to claim 1 wherein the first movement assembly further comprises a crescent assembly having a substantially arcuate track and one or more arms and/or webs extending radially therefrom configured to engage the beam such that driving a periphery of the crescent assembly by its track pivots the beam through the arcuate path.

13. An installation according to claim 12 wherein the crescent assembly is mounted off-centre relative to the respective modules and support posts such that the crescent assembly is movable through:
- a first position in which a first end of the arcuate track substantially underlies the beam and the modules are pivoted in a first direction;
- a second position in which a location toward the first end of the arcuate track substantially underlies the beam and the modules are substantially parallel with the ground;
- a third position in which a central location of the arcuate track substantially underlies the beam and the modules are pivoted in a second direction; and
- a fourth position in which a second end of the arcuate track substantially underlies the beam and the modules are pivoted further in the second direction.

* * * * *